US011869478B2

(12) United States Patent
Swaminathan et al.

(10) Patent No.: US 11,869,478 B2
(45) Date of Patent: Jan. 9, 2024

(54) AUDIO PROCESSING USING SOUND SOURCE REPRESENTATIONS

(71) Applicant: QUALCOMM Incorporated, San Diego, CA (US)

(72) Inventors: Siddhartha Goutham Swaminathan, San Diego, CA (US); Sunkuk Moon, San Diego, CA (US); Shuhua Zhang, San Diego, CA (US); Erik Visser, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 33 days.

(21) Appl. No.: 17/655,511

(22) Filed: Mar. 18, 2022

(65) Prior Publication Data

US 2023/0298561 A1 Sep. 21, 2023

(51) Int. Cl.
*G10K 11/16* (2006.01)
*G10K 11/178* (2006.01)
*H04R 1/10* (2006.01)
*H04R 3/00* (2006.01)

(52) U.S. Cl.
CPC .. *G10K 11/17881* (2018.01); *G10K 11/17827* (2018.01); *H04R 1/1083* (2013.01); *H04R 3/005* (2013.01)

(58) Field of Classification Search
CPC ........ G10K 11/17881; G10K 11/17827; H04R 1/1083; H04R 3/005
USPC ...................................................... 381/71.8
See application file for complete search history.

(56) References Cited

U.S. PATENT DOCUMENTS

| 2005/0195990 | A1* | 9/2005 | Kondo ..................... G10L 25/90 381/98 |
| 2012/0308039 | A1 | 12/2012 | Kobayashi et al. |
| 2013/0022216 | A1 | 1/2013 | Ganong, III et al. |
| 2017/0098453 | A1 | 4/2017 | Wright et al. |
| 2018/0122403 | A1 | 5/2018 | Koretzky et al. |
| 2019/0318754 | A1 | 10/2019 | Le Roux et al. |
| 2020/0265824 | A1* | 8/2020 | Kremer ............ G10K 11/17885 |
| 2021/0166714 | A1* | 6/2021 | Linton ................ G10L 21/0308 |
| 2021/0366497 | A1* | 11/2021 | Lim ...................... G10L 19/032 |
| 2022/0269473 | A1 | 8/2022 | Robert Jose |

FOREIGN PATENT DOCUMENTS

| CN | 111739553 A | 10/2020 |
| JP | 2008295011 A | 12/2008 |

OTHER PUBLICATIONS

International Search Report and Written Opinion—PCT/US2023/064515—ISA/EPO—dated May 15, 2023.

(Continued)

*Primary Examiner* — Ammar T Hamid
(74) *Attorney, Agent, or Firm* — QUALCOMM Incorporated; Espartaco Diaz Hidalgo

(57) ABSTRACT

A device includes one or more processors configured to receive an input audio signal. The one or more processors are also configured to process the input audio signal based on a combined representation of multiple sound sources to generate an output audio signal. The combined representation is used to selectively retain or remove sounds of the multiple sound sources from the input audio signal. The one or more processors are further configured to provide the output audio signal to a second device.

30 Claims, 14 Drawing Sheets

FIG. 1

(56) References Cited

OTHER PUBLICATIONS

Chaudhary K., "Understanding Audio Data, Fourier Transform, FFT and Spectrogram Features for a Speech Recognition System", Jan. 18, 2020, pp. 1-19.

Wang Q., et al., "VoiceFilter: Targeted Voice Separation by Speaker-Conditioned Spectrogram Masking", arXiv:1810.04826v6 [eess.AS] Jun. 19, 2019, pp. 1-5.

Wang Q., et al., "VoiceFilter-Lite: Streaming Targeted Voice Separation for On-Device Speech Recognition", arXiv:2009.04323v1 [eess.AS] Sep. 9, 2020, pp. 1-5.

* cited by examiner ated along with audio from sound sources that are of interest, which can lead to a less satisfactory user experience, to inefficient use of resources (e.g., processor time or transmission bandwidth), or both.
AUDIO PROCESSING USING SOUND SOURCE REPRESENTATIONS

I. FIELD

The present disclosure is generally related to processing audio based on representations of sound sources.

II. DESCRIPTION OF RELATED ART

Advances in technology have resulted in smaller and more powerful computing devices. For example, there exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality to receive an audio signal from one or more microphones. For example, the audio signal can include sounds from multiple sound sources. In some circumstances, only the sound from some of these sound sources is of interest. In such circumstances, audio from sound sources that are not of interest may be processed or transmitted along with audio from sound sources that are of interest, which can lead to a less satisfactory user experience, to inefficient use of resources (e.g., processor time or transmission bandwidth), or both.

III. SUMMARY

According to one implementation of the present disclosure, a device includes one or more processors configured to receive an input audio signal. The one or more processors are also configured to process the input audio signal based on a combined representation of multiple sound sources to generate an output audio signal. The combined representation is used to selectively retain or remove sounds of the multiple sound sources from the input audio signal. The one or more processors are further configured to provide the output audio signal to a second device.

According to another implementation of the present disclosure, a method includes receiving an input audio signal at a first device. The method also includes processing the input audio signal based on a combined representation of multiple sound sources to generate an output audio signal. The combined representation is used to selectively retain or remove sounds of the multiple sound sources from the input audio signal. The method further includes providing the output audio signal to a second device.

According to another implementation of the present disclosure, a non-transitory computer-readable medium includes instructions that, when executed by one or more processors, cause the one or more processors to receive an input audio signal at a first device. The instructions, when executed by the one or more processors, also cause the one or more processors to process the input audio signal based on a combined representation of multiple sound sources to generate an output audio signal. The combined representation is used to selectively retain or remove sounds of the multiple sound sources from the input audio signal. The instructions, when executed by the one or more processors, further cause the one or more processors to provide the output audio signal to a second device.

According to another implementation of the present disclosure, an apparatus includes means for receiving an input audio signal at a first device. The apparatus also includes means for processing the input audio signal based on a combined representation of multiple sound sources to generate an output audio signal. The combined representation is used to selectively retain or remove sounds of the multiple sound sources from the input audio signal. The apparatus further includes means for providing the output audio signal to a second device.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

An input audio signal can include sounds from multiple sound sources. Sounds from only some of the multiple sound sources may be of interest. For example, during a conference call, speech of call participants may be of interest, while speech of people speaking in the background, non-speech noise, etc. may be distracting. In another example, an audio signal includes speech of one or more known users and speech of an unknown person, and the speech of the unknown person is of interest. Retaining or removing sounds of selected sound sources can enhance the perceptibility of sounds of interest.

Systems and methods of processing audio based on sound source representations are disclosed. For example, an input audio signal is processed based on a sound representation of one or more sound sources to generate an output audio signal. The sound source representation is used to retain or remove sounds of the one or more sound sources from the input audio signal. For example, a sound source representation of speech of participants in a conference call can be used to retain the speech of the participants in the input audio signal while other sounds are not retained. As another example, a sound source representation of known users can be used to remove speech of the known users in the input audio signal while other sounds, including speech of an unknown user, are not removed. The perceptibility of the sounds of interest (such as the call participants or the unknown person) is thus enhanced in the output audio signal.

Figure 1:
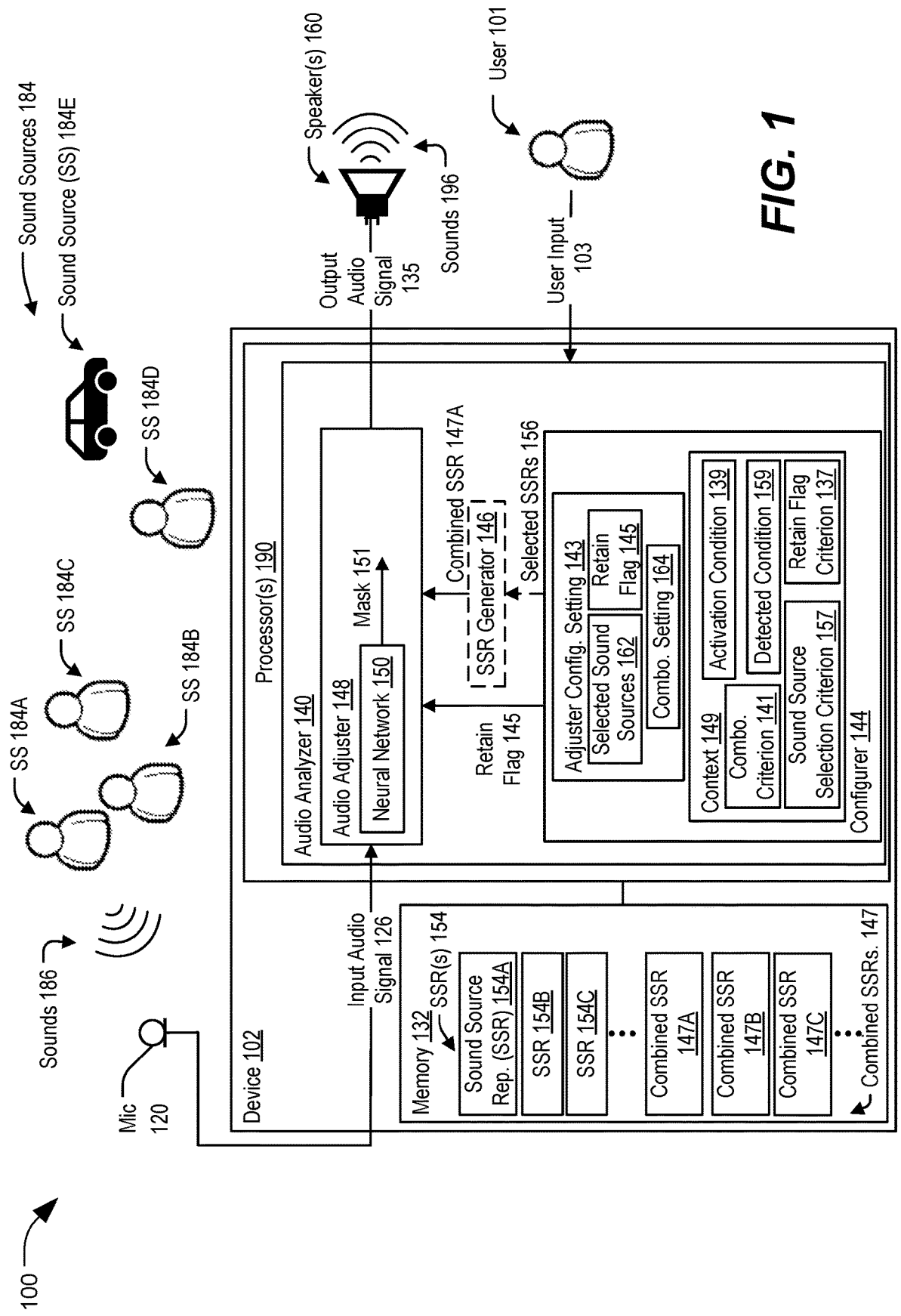
FIG. 1 is a block diagram of a particular illustrative aspect of a system operable to process audio based on sound source representations, in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 190 of FIG. 1), which indicates that in some implementations the device 102 includes a single processor 190 and in other implementations the device 102 includes multiple processors 190. For ease of reference herein, such features are generally introduced as "one or more" features and are subsequently referred to in the singular unless aspects related to multiple of the features are being described.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system configured to process audio based on sound source representations is disclosed and generally designated 100. The system 100 includes a device 102 that is coupled to one or more microphones 120, one or more speakers 160, or a combination thereof. The device 102 includes one or more processors 190 coupled to a memory 132.

The memory 132 stores one or more sound source representations (SSRs) 154, such as a sound source representation (SSR) 154A, a sound source representation 154B, a sound source representation 154C, one or more additional sound source representations, or a combination thereof. For example, a sound source representation 154A represents sounds (e.g., speech, non-speech sounds, or both) of a sound source 184A. In a particular aspect, the sound source representation 154A is based on sounds of the sound source 184A or based on sounds of a particular sound source that is of a same sound source type as the sound source 184A, as further described with reference to FIG. 2A.

In some aspects, the memory 132 stores one or more combined sound source representations 147, such as a combined sound source representation 147A, a combined sound source representation 147B, a combined sound source representation 147C, one or more additional combined sound source representations, or a combination thereof. For example, a combined sound source representation 147A represents sounds (e.g., speech, non-speech sounds, or both) of multiple sound sources, such as a sound source 184A, a sound source 184B, and a sound source 184C. In a particular aspect, the combined sound source representation 147A is based on a sound source representation 154A, a sound source representation 154B, and a sound source representation 154C that represent sounds of the sound source 184A, sounds of the sound source 184B, and sounds of the sound source 184C, respectively. In another aspect, the combined sound source representation 147A is based on sounds from the sound source 184A, the sound source 184B, and the sound source 184C or sounds from sound sources of the same type as the sound source 184A, the sound source 184B, and the sound source 184C, as further described with reference to FIGS. 2B-2C.

In some aspects, a sound source representation (e.g., the sound source representation 154A or the combined sound source representation 147B) can represent sounds of sound sources in a particular environment, as further described with reference to FIG. 2C. As an example, the combined sound source representation 147B can represent sounds (e.g., wind, road noise, etc.) captured in a particular type (e.g., make, model, sedan, sports utility vehicle (SUV), van, electrical, gas powered, hybrid, etc.) of vehicle while driving on a highway. In some aspects, one or more of the sound source representations 154, the one or more combined sound source representations 147, or both, are associated with metadata indicating corresponding sound source type information, such as demographic information, object type information, vehicle type information, person identifier, sound source identifier, environment information, etc.

The one or more processors 190 include an audio analyzer 140 configured to process audio based on sound source representations. The audio analyzer 140 includes a configurer 144 coupled to an audio adjuster 148. The configurer 144 is configured to determine an adjuster configuration setting 143 based on a context 149.

The adjuster configuration setting 143 indicates a value of a retain flag 145 and indicates selected sound sources 162. For example, a first value (e.g., 1) of the retain flag 145 indicates that sounds of the selected sound sources 162 are to be retained. A second value (e.g., 0) of the retain flag 145 indicates that sounds of the selected sound sources 162 are to be removed.

The context 149 indicates that, when a detected condition 159 matches an activation condition 139, the audio adjuster 148 is to be activated using an adjuster configuration setting 143 that is determined based on a sound source selection criterion 157 and a retain flag criterion 137. In some aspects, the activation condition 139, the sound source selection criterion 157, the retain flag criterion 137, or a combination thereof, are based on a default configuration, a user input 103, a configuration input from an application, a configuration request from another device, or a combination thereof. The configurer 144 is configured to determine the selected sound sources 162 based on the sound source selection criterion 157 and a value of the retain flag 145 based on the retain flag criterion 137.

Additionally, in some aspects, the configurer 144 is configured to provide a combined SSR 147A that represents sounds of the selected sound sources 162 to the audio adjuster 148. In some examples, the configurer 144 is configured to provide one or more selected sound source representations 156 of the selected sound sources 162 to a SSR generator 146. The SSR generator 146 is configured to generate the combined SSR 147A based on the one or more selected sound source representations 156, and store the combined sound source representation 147A in the memory 132. In these examples, the SSR generator 146 is configured to provide the combined SSR 147A to the audio adjuster 148.

The audio adjuster 148 is configured to use a neural network 150 to process, based on the combined sound source representation 147A, an input audio signal 126 to generate an output audio signal 135. For example, the audio adjuster 148 is configured to use the neural network 150 to generate a mask 151, as further described with reference to FIG. 3. The audio adjuster 148 generates the output audio signal 135 by applying the mask 151 to the input audio signal 126 based on a value of the retain flag 145 to retain or remove sounds of the selected sound sources 162. By selectively retaining or removing the sounds corresponding to the selected sound sources 162, the perceptibility of sounds of interest is enhanced in the output audio signal 135. Using the combined sound source representation 147A that can represent multiple sound sources to generate the mask 151 can be faster and use fewer computations as compared to using individual sound source representations to process the input audio signal 126. In some aspects, the neural network 150 includes a convolutional neural network (CNN), an autoregressive (AR) generative network, an audio generative network (AGN), an attention network (AN), a long short-term memory (LSTM) network, or a combination thereof.

In some implementations, the device 102 corresponds to or is included in one of various types of devices. In an illustrative example, the one or more processors 190 are integrated in a headset device that includes the one or more microphones 120, the one or more speakers 160, or a combination thereof, such as described further with reference to FIG. 11. In other examples, the one or more processors 190 are integrated in at least one of a mobile phone or a tablet computer device, as described with reference to FIG. 10, a wearable electronic device, as described with reference to FIG. 12, a voice-controlled speaker system, as described with reference to FIG. 13, a camera device, as described with reference to FIG. 14, or a virtual reality, mixed reality, or augmented reality headset, as described with reference to FIG. 15. In another illustrative example, the one or more processors 190 are integrated into a vehicle that also includes the one or more microphones 120, the one or more speakers 160, or a combination thereof, such as described further with reference to FIG. 16 and FIG. 17.

During operation, the configurer 144 determines a context 149 indicating that the audio adjuster 148 is to be activated when a detected condition 159 matches an activation condition 139 to retain or remove sounds of selected sound sources 162 from an input audio signal 126. The context 149 indicates that sound sources that satisfy a sound source selection criterion 157 are to be the selected sound sources 162, and sounds are to be retained or removed based on a retain flag criterion 137. The context 149 (e.g., the activation condition 139, the sound source selection criterion 157, and the retain flag criterion 137) is based on a default configuration, a user input 103, a configuration input from an application, a configuration request from another device, or a combination thereof.

In some examples, a user 101 provides a user input 103 to the audio analyzer 140. The audio analyzer 140 determines the context 149 based at least in part on the user input 103. In a first illustrative example, the user input 103 corresponds to creation or acceptance of a meeting invite for a scheduled meeting. In a particular aspect, the user input 103 indicates that speech of one or more participants of the scheduled meeting is to be retained. In another aspect, a default configuration indicates that speech of participants of any scheduled meeting is to be retained. The configurer 144, in response to receiving the user input 103, generates the context 149 to indicate an activation condition 139 indicating that the audio adjuster 148 is to be activated to initiate processing of the input audio signal 126 responsive to a start of the scheduled meeting. The configurer 144 also generates the context 149 to indicate a sound source selection criterion 157 indicating that the selected sound sources 162 are to correspond to participants of the scheduled meeting and a retain flag criterion 137 indicating that the retain flag 145 is to have the first value (e.g., 1).

In a second illustrative example, the user input 103 corresponds to a user selection in an audio processing application to activate the audio adjuster 148 to remove sounds of known users (e.g., a sound source 184A, a sound source 184B, and a sound source 184C) from the input audio signal 126. The configurer 144, in response to receiving the user input 103, generates the context 149 to indicate that a detected condition 159 (e.g., receiving the user input 103) matches an activation condition 139 to activate the audio adjuster 148. The configurer 144 also updates the context 149 to indicate a sound source selection criterion 157 that the selected sound sources 162 are to include the known users (e.g., the sound source 184A, the sound source 184B, and the sound source 184C) and a retain flag criterion 137 that the retain flag 145 is to have the second value (e.g., 0). Operation of the audio adjuster 148 is described herein with reference to the first and second illustrative examples for ease of description. It should be understood that various other examples of operation of the audio adjuster 148 to retain or remove sounds are possible. To illustrate, in an example, the user input 103 corresponds to activation of a recording application. The configurer 144, in response to receiving the user input 103, generates the context 149 to indicate that a detected condition 159 (e.g., receiving the user input 103) matches an activation condition 139 to activate the audio adjuster 148. The configurer 144 also updates the context 149 to indicate a sound source selection criterion 157 that the selected sound sources 162 are to correspond to an estimated target of the recording and a retain flag criterion 137 that the retain flag 145 is to have the first value (e.g., 1).

The audio adjuster 148, when activated, initiates processing of the input audio signal 126. For example, the audio adjuster 148 uses sound source representations of the selected sound sources 162 to retain or remove sounds from the input audio signal 126, as described further below. In some implementations, the configurer 144 retrieves a sound source representation of at least one sound source that is likely to be included in the selected sound sources 162 (e.g., a sound source that is expected to satisfy the sound source selection criterion 157) prior to activation of the audio adjuster 148. For example, the configurer 144, in response to determining that the selected sound sources 162 are likely to include the sound source 184A, retrieves the sound source representation 154A (e.g., representing speech) of the sound source 184A from a server and stores the sound source representation 154A locally at (e.g., in the memory 132 of) the device 102. In the first illustrative example, the configurer 144 determines that the sound source 184A is likely to satisfy the sound source selection criterion 157 (e.g., is likely to be included in the selected sound sources 162) in response to determining that a meeting invite has been sent to the sound source 184A for the scheduled meeting. In the second illustrative example, the configurer 144 determines that the sound source 184A is likely to satisfy the sound source selection criterion 157 (e.g., is likely to be included in the selected sound sources 162) in response to determining that the known users include the sound source 184A.

In some implementations, the configurer 144 generates (or updates) SSRs of at least one sound source that is likely to be included in the selected sound sources 162 prior to activation of the audio adjuster 148. For example, the configurer 144, in response to determining that the selected sound sources 162 is likely to include the sound source 184B, generates the sound source representation 154B based on an input audio signal representing sounds of the sound source 184B, as further described with reference to FIG. 2A. To illustrate, the input audio signal is received during a call between the user 101 and the sound source 184B.

In some implementations, the configurer 144 generates (or updates) SSRs of one or more sound sources 184 (e.g., at least one of the selected sound sources 162) while the audio adjuster 148 is activated. For example, the configurer 144, in response to determining that a portion of the input audio signal 126 corresponds to a single talker and that the single talker is the sound source 184B, generates (or updates) the sound source representation 154B based on the portion of the input audio signal 126, as further described with reference to FIG. 2A.

The input audio signal 126 corresponds to sounds 186 of sound sources 184, such as the sound source 184A, the sound source 184B, the sound source 184C, a sound source 184D, a sound source 184E, one or more additional sound sources, or a combination thereof. A sound source 184 can include one or more of a vehicle, an emergency vehicle, traffic, wind, reverberation, channel distortion, a bird, an animal, an alarm, another non-speech sound source, a person, an authorized user, another speech source, or an audio player.

The audio analyzer 140 receives the input audio signal 126 from another device (e.g., a server or a storage device), the one or more microphones 120, the memory 132, or a combination thereof. In the first illustrative example, the audio analyzer 140 receives the input audio signal 126 from a server during the scheduled meeting. To illustrate, the input audio signal 126 is based on audio data received from another device (e.g., the server), as further described with reference to FIG. 6. In the second illustrative example, the audio analyzer 140 receives the input audio signal 126 from the one or more microphones 120. To illustrate, the one or more microphones 120 capture the sounds 186 and the input audio signal 126 is based on a microphone output of the one or more microphones 120.

In some examples, the input audio signal 126 is based on audio data retrieved from the memory 132. To illustrate, the input audio signal 126 is based on audio data generated by an application, such as a music application, a gaming application, a graphics application, an augmented reality application, a communication application, an entertainment application, or a combination thereof, of the one or more processors 190. In some examples, the audio adjuster 148 processes the input audio signal 126 in real-time as the audio analyzer 140 receives the input audio signal 126. In other examples, the input audio signal 126 corresponds to a previously generated audio signal.

The configurer 144 determines that the context 149 indicates that, when a detected condition 159 matches the activation condition 139, the audio adjuster 148 is to be activated with an adjuster configuration setting 143 that is based on the sound source selection criterion 157 and the retain flag criterion 137. In the first illustrative example, the configurer 144 activates the audio adjuster 148 in response to determining that a detected condition 159 (e.g., start of a scheduled meeting) matches the activation condition 139 (e.g., start of the scheduled meeting). The configurer 144 determines the adjuster configuration setting 143 based on the context 149. For example, the configurer 144, in response to determining that the sound source selection criterion 157 indicates that the selected sound sources 162 are to correspond to participants of the scheduled meeting and that the retain flag criterion 137 indicates that the retain flag 145 is to have the first value (e.g., 1), designates the participants (e.g., expected participants, detected participants, or a combination thereof) as the selected sound sources 162 and sets the retain flag 145 to have the first value (e.g., 1) indicating that corresponding sounds are to be retained.

The sound source selection criterion 157 can be used to determine the selected sound sources 162 statically (e.g., expected participants), dynamically (e.g., detected participants), or both. In the first illustrative example, a static determination of the selected sound sources 162 can include expected participants of the scheduled meeting and additional detected participants (e.g., participants who joined the meeting although not originally invited) can be dynamically added to the selected sound sources 162.

In the second illustrative example, the configurer 144 activates the audio adjuster 148 in response to determining that the context 149 indicates that the detected condition 159 (e.g., receiving the user input 103 indicating a user selection in the audio processing application) matches the activation condition 139. The configurer 144 determines the adjuster configuration setting 143 based on the context 149. For example, the configurer 144, in response to determining that the sound source selection criterion 157 indicates that the selected sound sources 162 are to correspond to known users (e.g., the sound source 184A, the sound source 184B, and the sound source 184C) and that the retain flag criterion 137 indicates that the retain flag 145 is to have a second value (e.g., 0), activates the audio adjuster 148, designates the known users as the selected sound sources 162, and sets the retain flag 145 to have the second value (e.g., 0) indicating that corresponding sounds are to be removed.

The sound source selection criterion 157 can be used to determine the selected sound sources 162 statically (e.g., all of the known users), dynamically (e.g., detected one of the known users), or both. In the second illustrative example, a static determination of the selected sound sources 162 can include all of the known users and one or more of the known users (e.g., whose speech is not detected within a threshold duration) can be dynamically removed from the selected sound sources 162.

The retain flag criterion 137 can be used to determine the value of the retain flag 145 statically or dynamically. In the first illustrative example, the retain flag criterion 137 corresponds to a static determination of the value of the retain flag 145 (e.g., the first value to retain sounds). In the second illustrative example, the retain flag criterion 137 corresponds to a static determination of the value of the retain flag 145 (e.g., the second value to remove sounds). In various aspects, the retain flag criterion 137 can be used to dynamically determine the value of the retain flag 145. In an example, the user input 103 corresponds to activation of a recording application. The configurer 144, in response to receiving the user input 103, generates the context 149 to indicate that a detected condition 159 (e.g., receiving the user input 103) matches an activation condition 139 to activate the audio adjuster 148. The configurer 144 also updates the context 149 to indicate a sound source selection criterion 157 that the selected sound sources 162 are to correspond to one or more estimated targets of the recording if sound source representations of the estimated targets are available. The sound source selection criterion 157 indicates, if the sound source representations of the estimated targets are unavailable, the selected sound sources 162 are to correspond to one or more interfering sound sources if the sound source representations of the interfering sound sources are available. The retain flag criterion 137 indicates that the retain flag 145 is to have the first value (e.g., 1) to retain sounds if the selected sound sources 162 correspond to the estimated targets. The retain flag criterion 137 also indicates that the retain flag 145 is to have the second value (e.g., 0) to remove sounds if the selected sound sources 162 correspond to the interfering sound sources. In this example, the sound source selection criterion 157 is used to dynamically determine the selected sound sources 162 and the retain flag criterion 137 is used to dynamically determine the value of the retain flag 145.

The configurer 144, concurrently with activating the audio adjuster 148, provides a value of the retain flag 145 and a combined sound source representation 147A of the selected sound sources 162 to the audio adjuster 148. In some examples, the configurer 144 has access to the combined sound source representation 147A and provides the combined sound source representation 147A to the audio adjuster 148 (e.g., bypasses the SSR generator 146). In other examples, the configurer 144 provides one or more selected sound source representations 156 of the selected sound sources 162 to the SSR generator 146, and the SSR generator 146 provides the combined sound source representation 147A to the audio adjuster 148.

In some implementations, the adjuster configuration setting 143 includes a combination (combo.) setting 164. A first value (e.g., 0) of the combination setting 164 indicates that the configurer 144 is to provide individual sound source representations of the selected sound sources 162 to the SSR generator 146 independently of whether a combined sound source representation of two or more of the selected sound sources 162 is available. A second value (e.g., 1) of the combination setting 164 indicates that the configurer 144 is to bypass the SSR generator 146 and provide a combined sound source representation of all of the selected sound sources 162 to the audio adjuster 148 when the combined sound source representation is available.

In some implementations, the combination setting 164 is based on the context 149. For example, the context 149 includes a combination criterion 141 to determine the combination setting 164. The combination criterion 141 is based on a default configuration, a user input 103, a configuration input from an application, a configuration request from another device, or a combination thereof. The combination criterion 141 can indicate that the combination setting 164 is to have a particular value (e.g., 0 or 1). In a particular aspect, the combination criterion 141 can be used to determine the combination setting 164 statically, dynamically, or both. For example, a static determination of the combination setting 164 can have a first value (e.g., 0) that the configurer 144 can update dynamically to a second value (e.g., 1) responsive to a detected combination condition (e.g., remaining battery life is less than a threshold).

As an illustrative example, the selected sound sources 162 include the sound source 184A, the sound source 184B, and the sound source 184C. The configurer 144, in response to determining that the combination setting 164 has the second value (e.g., 1), determines whether a combined sound source representation that represents all of the selected sound sources 162 is available (e.g., in the memory 132 or another device). The configurer 144, in response to determining that the sound source type information of the combined sound source representation 147A matches sound source type information of each of the selected sound sources 162, determines that the combined sound source representation 147A represents all of the selected sound sources 162 and bypasses the SSR generator 146 to provide the combined sound source representation 147A to the audio adjuster 148.

Alternatively, the configurer 144, in response to determining that a combined sound source representation of all of the selected sound sources 162 is unavailable, determines whether a SSR for multiple of the selected sound sources 162 is available (e.g., in the memory 132 or another device). The configurer 144, in response to determining that the combination setting 164 has the second value (e.g., 1) and that a combined sound source representation 147B of sounds of the sound source representation 154B and the sound source representation 154C is available, adds the combined sound source representation 147B to the one or more selected sound source representations 156.

The configurer 144, in response to determining that the combination setting 164 has the first value (e.g., 0) or that the sound source 184A of the selected sound sources 162 is not represented by any combined SSRs included in the one or more selected sound source representations 156, determines whether an individual SSR of the sound source 184A is available. For example, the configurer 144, in response to determining that first sound source type information of the sound source representation 154A matches second sound source type information of the sound source 184A, selects the sound source representation 154A as representing the sound source 184A and adds the sound source representation 154A to the one or more selected sound source representations 156. The configurer 144 provides the one or more selected sound source representations 156 to the SSR generator 146.

The SSR generator 146 generates the combined sound source representation 147A based on the one or more selected sound source representations 156. In some implementations, a SSR includes feature values of audio features (e.g., short-term spectral features, voice source features, spectro-temporal features, prosodic features, high-level features, or a combination thereof) that represent sounds of a sound source. For example, the sound source representation 154A includes a first feature value of a first audio feature, the sound source representation 154B includes a second feature value of the first audio feature, and the sound source representation 154C includes a third feature value of the first audio feature. In some implementations, a SSR indicates feature values of 512 audio features. In an illustrative example, a SSR is represented by a multi-dimensional (e.g., 512-dimensional) vector.

The combined sound source representation 147B (representing sounds of the sound source 184B and the sound source 184C) includes a first particular feature value of the first audio feature that is based on the second feature value and the third feature value. In a particular implementation, the combined sound source representation 147B corresponds to the sound source representation 154B concatenated with the sound source representation 154C, an average of the sound source representation 154B and the sound source representation 154C, or both. In this example, the first particular feature value corresponds to a concatenation of (or a list including) the second feature value and the third feature value, an average of the second feature value and the third feature value, or both. The combined sound source representation 147A includes a second particular feature value of the first audio feature that is based on (e.g., a list, an average, or both of) the first feature value (e.g., of the sound source representation 154A) and the first particular feature value (e.g., of the combined sound source representation 147B).

The one or more selected sound source representations 156 including the sound source representation 154A and the combined sound source representation 147B is provided as an illustrative example. In other examples, the one or more selected sound source representations 156 can include separate SSRs for each of the selected sound sources 162 or multiple combined SSRs for various combinations of the selected sound sources 162. As an example, the one or more selected sound source representations 156 can include a sound source representation 154A that represents sounds of the sound source 184A, a sound source representation 154B that represents sounds of the sound source 184B, and a sound source representation 154C that represents sounds of the sound source 184C. In another example, the one or more selected sound source representations 156 can include a combined sound source representation 147B that represents sounds of the sound source 184B and the sound source 184C, and a combined sound source representation 147C that represents sounds of the sound source 184A and the sound source 184C.

In some implementations, the configurer 144 dynamically updates the adjuster configuration setting 143 and the combined sound source representation 147A while the audio adjuster 148 processes the input audio signal 126. For example, the configurer 144, in response to determining that the sound source selection criterion 157, the sound sources 184 that satisfy the sound source selection criterion 157, or both, have changed, that the context 149 indicates that the selected sound sources 162 are to correspond to participants of the scheduled meeting and detecting an update in the participants (e.g., because of people leaving or joining the call), dynamically updates the selected sound sources 162 (and the combined sound source representation 147A provided to the audio adjuster 148). In the first illustrative example, the configurer 144, in response to determining that the sound source selection criterion 157 indicates that the selected sound sources 162 are to correspond to detected participants of the scheduled meeting and detecting an update in the participants (e.g., because of people leaving or joining the call), dynamically updates the selected sound sources 162 to include the detected participants (and updates the combined sound source representation 147A provided to the audio adjuster 148). In the second illustrative example, the configurer 144, in response to determining that the context 149 indicates that the selected sound sources 162 are to correspond to known users (e.g., the sound source 184A, the sound source 184B, and the sound source 184C) and detecting that speech of one (e.g., the sound source 184A) of the known users is not detected in the input audio signal 126 within a threshold time, dynamically removes the known user from the selected sound sources 162 (and updates the combined sound source representation 147A provided to the audio adjuster 148). The configurer 144 can subsequently add the removed known user to the selected sound sources 162 (and update the combined sound source representation 147A provided to the audio adjuster 148) if speech of the known user is detected later in the input audio signal 126.

While activated, the audio adjuster 148 processes the input audio signal 126 based on the combined sound source representation 147A and the value of the retain flag 145 to retain or remove sounds to generate the output audio signal 135. For example, the audio adjuster 148 uses the neural network 150 to process the input audio signal 126 based on the one or more combined sound source representations 147 to generate a mask 151, as further described with reference to FIG. 3.

The audio adjuster 148, responsive to the retain flag 145 having a first value (e.g., 1), applies a filter corresponding to the mask 151 to the input audio signal 126 to retain sounds of the selected sound sources 162 and to remove remaining sounds. In the first illustrative example, the audio adjuster 148 retains the sounds of participants (e.g., the sound source 184A, the sound source 184B, and the sound source 184C) of the scheduled meeting in the input audio signal 126 to generate the output audio signal 135. The remaining sounds, such as the sound source 184D (e.g., speech noise, such as a non-participant speaking in the background) and the sound source 184E (e.g., non-speech noise, such as a passing vehicle) are not included (or are reduced) in the output audio signal 135. Alternatively, the audio adjuster 148, responsive to the retain flag 145 having a second value (e.g., 0), applies a filter corresponding to an inverse of the mask 151 to the input audio signal 126 to remove sounds of the selected sound sources 162 and to retain remaining sounds. In the second illustrative example, the audio adjuster 148 removes the sounds of the known users (e.g., the sound source 184A, the sound source 184B, and the sound source 184C) in the input audio signal 126 to generate the output audio signal 135. The remaining sounds, such as the sound source 184D (e.g., speech of an unknown person) and the sound source 184E (e.g., non-speech sound, such as an emergency vehicle) are included (or relatively enhanced) in the output audio signal 135.

A technical effect of using the mask 151 that is based on the combined sound source representation 147A to filter sounds of the input audio signal 126 can be increased efficiency (e.g., fewer computations) than filtering sounds based on separate sound source representations for each of the selected sound sources 162. In some aspects, the increased efficiency may enable real-time processing of the input audio signal 126. Another technical effect of using the mask 151 that is based on the combined sound source representation 147A to filter sounds of the input audio signal 126 can be increased accuracy in filtering portions of the input audio signal 126 that include overlapping sounds from multiple of the selected sound sources 162 as compared to filtering sequentially based on each of the separate sound source representations.

The audio analyzer 140 provides the output audio signal 135 to the one or more speakers 160. The one or more speakers 160 output sounds 196 based on the output audio signal 135. The sounds of interest are more perceptible in the sounds 196 as compared to the sounds 186 of the sound sources 184. In some examples, the audio analyzer 140 provides audio data based on the output audio signal 135 to another device, as further described with reference to FIG. 7. In some examples, the audio analyzer 140 stores the audio data based on the output audio signal 135 in the memory 132, another storage device, or both.

The system 100 thus enhances the perception of sounds of interest in the output audio signal 135 by retaining the sounds of interest or removing the remaining sounds. Using the combined sound source representation 147A representing sounds of the selected sound sources 162 can improve efficiency and accuracy of processing the input audio signal 126 to generate the output audio signal 135.

Although the one or more microphones 120, the one or more speakers 160, or a combination thereof are illustrated as being coupled to the device 102, in other implementations the one or more microphones 120, the one or more speakers 160, or a combination thereof may be integrated in the device 102. Although the device 102 is illustrated as including the configurer 144, the SSR generator 146, and the audio adjuster 148, in other implementations the configurer 144, the SSR generator 146, and the audio adjuster 148 can be included in two or more separate devices. As an illustrative example, the configurer 144 and the SSR generator 146 can be included in a user device, and the audio adjuster 148 can be included in a headset.

Figure 2A:
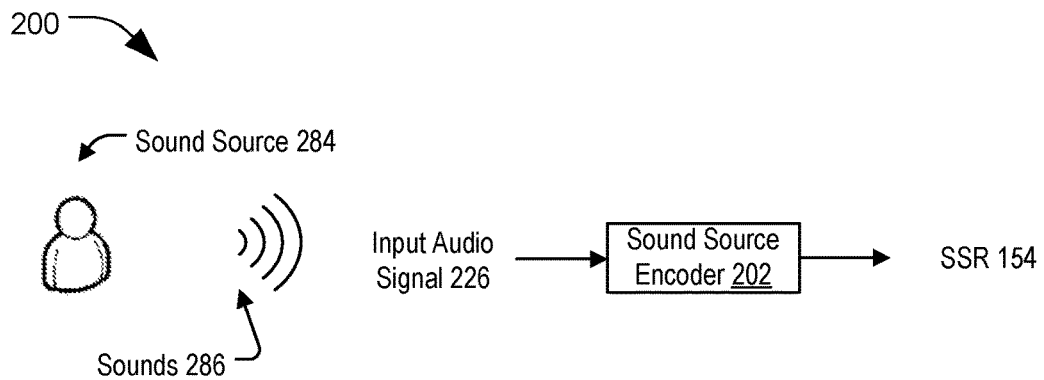
FIG. 2A is a diagram of an illustrative aspect of a sound source encoder operable to generate a sound source representation, in accordance with some examples of the present disclosure.

Referring to FIG. 2A, a diagram 200 of an illustrative aspect of a sound source encoder 202 operable to generate a sound source representation 154 is shown. In some implementations, the device 102 of FIG. 1 includes the sound source encoder 202. In other implementations, the sound source encoder 202 is included in a second device that provides the sound source representation 154 to the device 102.

An input audio signal 226 represents sounds 286 of a sound source 284. In some aspects, the input audio signal 226 is based on a microphone output of one or more microphones that captured the sounds 286. In some aspects, the input audio signal 226 is based on audio data received from another device, generated by an application, or a combination thereof.

The sound source encoder 202 processes the input audio signal 226 using various techniques to generate the sound source representation 154 of the sounds 286. In a particular aspect, the sound source encoder 202 performs a fast fourier transform (FFT) of portions (e.g., 20 millisecond time windows) of the input audio signal 226 to determine time-frequency information of the input audio signal 226. In this aspect, the sound source representation 154 (e.g., a spectrogram) is based on first FFT features associated with a first time window, second FFT features associated with a second time window, and so on. In some implementations, the sound source representation 154 includes a temporal envelope of the input audio signal 226, a frequency composition of the input audio signal 226, a time-frequency representation (e.g., one or more spectrograms, one or more cochleograms, one or more correlograms, etc.) of the input audio signal 226, or a combination thereof.

The sound source encoder 202 also generates metadata of the sound source representation 154 that includes sound source type information (e.g., demographic information, object type information, vehicle type information, person identifier, sound source identifier, environment information, etc.) of the sound source 284. The configurer 144 of FIG. 1 determines that the sound source representation 154 represents sounds of a sound source 184 in response to determining that the sound source 184 is a same sound source type as the sound source 284. The configurer 144 determines that the sound source 184 is the same sound source type as the sound source 284 in response to determining that the sound source type information associated with the sound source representation 154 matches the sound source type information of the sound source 184.

In some implementations, the sound source type information is ordered by match priority. The configurer 144, in response to selecting that multiple sound source representations have corresponding sound source type information that matches the sound source type information of the sound source 184, selects the sound source representation with matching sound source type information with the highest match priority as representing the sounds of the sound source 184. For example, the sound source identifier has a higher match priority than other types of sound source type information, such as demographic information. To illustrate, a sound source representation 154 with the same source identifier as a source identifier of the sound source 184 has higher priority (e.g., is a closer match) than sound source representations with other types of matching type information because matching sound source identifiers indicate that the sound source 184 is the same as the sound source 284.

In some aspects, although the sound source 284 is not the same as the sound source 184, the sound source 284 is of a same type as the sound source 184. In a particular example, the sound source 184 is a first person and the sound source 284 is a second person with one or more second demographic characteristics (e.g., age, location, race, ethnicity, gender, or a combination thereof) that match one or more first demographic characteristics of the first person. In some examples, the sound source 284 is an object of the same type (e.g., a vehicle, a bird, or breaking glass) as the sound source 184. As another example, the sound source 284 is a vehicle of the same type (e.g., an ambulance, a fire truck, a police car, or an airplane) as the sound source 184. In an example, the sound source 284 is an alarm of the same type (e.g., a fire alarm, a manufacturing alarm, a smoke detector alarm, etc.).

In some examples, the configurer 144 updates the sound source representation 154 based on sounds of the sound source 184 in response to determining that the sound source 184 is the same as the sound source 284. In some examples, the configurer 144 updates the sound source representation 154 based on sounds of the sound source 184 in response to determining that, although the sound source 184 is distinct from the sound source 284, the sound source 184 is the same sound source type as the sound source 284.

Figure 2B:
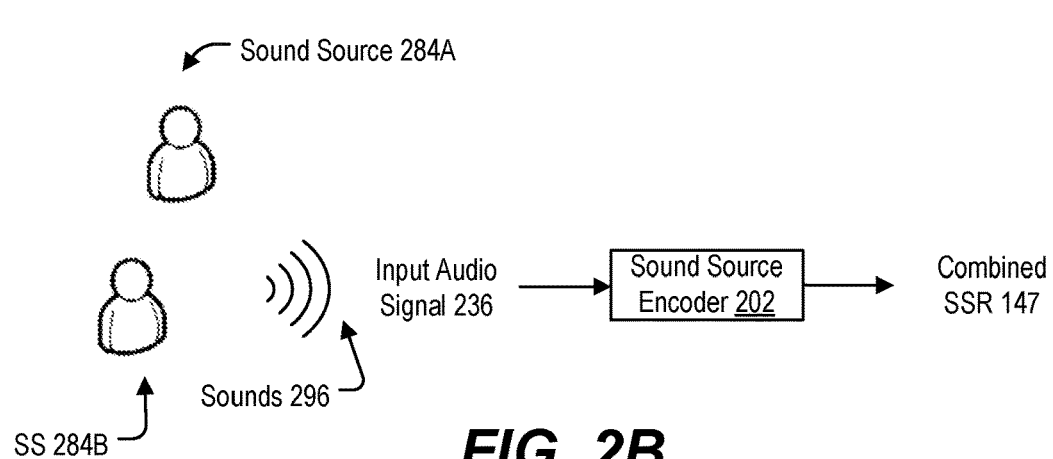
FIG. 2B is a diagram of another illustrative aspect of a sound source encoder operable to generate a sound source representation, in accordance with some examples of the present disclosure.

Referring to FIG. 2B, a diagram 230 of an illustrative aspect of the sound source encoder 202 operable to generate a combined sound source representation 147 is shown.

An input audio signal 236 represents sounds 296 of multiple sound sources, such as a sound source 284A and a sound source 284B. In some aspects, the input audio signal 236 is based on a microphone output of one or more microphones that captured the sounds 296. In some aspects, the input audio signal 236 is based on audio data received from another device, generated by an application, or a combination thereof.

The sound source encoder 202 processes the input audio signal 236 using various techniques to generate the combined sound source representation 147 of the sounds 296. For example, the combined sound source representation 147 includes a temporal envelope of the input audio signal 236, a frequency composition of the input audio signal 236, a time-frequency representation (e.g., a spectrogram, cochleogram, correlogram, etc.) of the input audio signal 236, or a combination thereof.

The sound source encoder 202 also generates metadata of the combined sound source representation 147 that includes first sets of sound source type information (e.g., first sound source type information of the sound source 284A and second sound source type information of the sound source 284B). The configurer 144 of FIG. 1 determines that the combined sound source representation 147 represents sounds of multiple sound sources (e.g., a sound source 184A and a sound source 184B) in response to determining that there is a one-to-one match between each of the first sets of sound source type information and second sets of sound source type information of the multiple sound sources (e.g., the sound source 184A and the sound source 184B). For example, the configurer 144 of FIG. 1 determines that the combined sound source representation 147 represents sounds of the sound source 184A and the sound source 184B in response to determining that the sound source 284A is the same sound source type as the sound source 184A and the sound source 284B is the same sound source type as the sound source 184B.

In some examples, the configurer 144 updates the combined sound source representation 147 based on sounds of any of the multiple sound sources (e.g., the sound source 184A and the sound source 184B). For example, the configurer 144 updates the combined sound source representation 147 based on sounds of the sound source 184A and the sound source 184B in response to determining that the sound source 184A and the sound source 184B are the same as the sound source 284A and the sound source 284B, respectively. In another example, the configurer 144 updates the combined sound source representation 147 based on sounds of the sound source 184A and the sound source 184B in response to determining that, although the sound source 184A and the sound source 184B are distinct from the sound source 284A and the sound source 284B, respectively, the sound source 184A and the sound source 184B are the same sound source type as the sound source 284A and the sound source 284B, respectively.

Figure 2C:
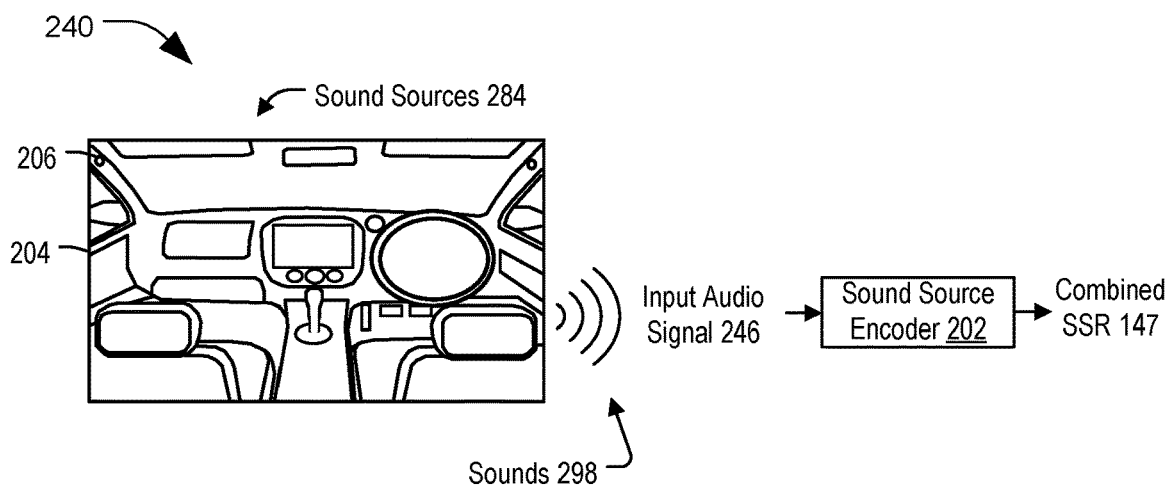
FIG. 2C is a diagram of another illustrative aspect of a sound source encoder operable to generate a sound source representation, in accordance with some examples of the present disclosure.

Referring to FIG. 2C, a diagram 240 of an illustrative aspect of the sound source encoder 202 operable to generate a combined sound source representation 147 that represents sounds of an environment 204 is shown.

An input audio signal 246 represents sounds 298 of the environment 204. The environment 204 corresponds to multiple sound sources 284 that can include various elements that impact the sounds 298. For example, an environment 204 can include an interior of a particular vehicle during operation of the vehicle. In this example, the environment 204 can correspond to sound sources 284 that include elements such as wind, traffic, tires, road, operational conditions (e.g., speed, partially open windows, fully open windows, etc.), interior shape, exterior shape, other acoustic characteristics, or a combination thereof. As another example, the environment 204 can correspond to an interior of a particular manufacturing facility. In this example, the environment 204 can correspond to sound sources 284 that include elements such as machine noises, particular alarms, windows, doors, operational conditions (e.g., machine speed, open window, closed window, open door, closed door), facility interior shape, facility exterior shape, other acoustic characteristics, or a combination thereof.

A vehicle and a manufacturing facility are provided as illustrative non-limiting examples of the environment 204. The environment 204 can include various other types of environments, such as an aircraft environment, a stock exchange environment, other types of indoor environments, a beach, a concert, a market, other types of outdoor environments, a virtual environment, an augmented environment, etc. In some examples, the sound sources 284 correspond to background noise (e.g., the sounds 298) in the environment 204.

In some aspects, the input audio signal 246 is based on a microphone output of one or more microphones 206 that capture the sounds 298. In some aspects, the input audio signal 246 is based on audio data received from another device, generated by an application, or a combination thereof.

The sound source encoder 202 processes the input audio signal 246 using various techniques to generate the combined sound source representation 147 of the sounds 298. For example, the combined sound source representation 147 includes a temporal envelope of the input audio signal 246, a frequency composition of the input audio signal 246, a time-frequency representation (e.g., a spectrogram, cochleogram, correlogram, etc.) of the input audio signal 246, or a combination thereof.

The sound source encoder 202 also generates metadata of the combined sound source representation 147 that includes sound source type information (e.g., an environment identifier, an environment type, a vehicle type, a tire type, an operational condition, an interior shape type, an exterior shape type, a building type, a location type, an operational state, an event type, or a combination thereof) of the environment 204. The configurer 144 of FIG. 1 determines that the combined sound source representation 147 represents sound sources 184 (e.g., an environment with one or more matching elements of the environment 204). For example, the configurer 144 of FIG. 1 can determine that the combined sound source representation 147 represents a first environment (e.g., a vehicle) with first sound source type information that matches second sound source type information of the environment 204 (e.g., a second vehicle).

In some examples, the configurer 144 updates the combined sound source representation 147 based on sounds of the sound sources 184 (e.g., the first environment) in response to determining that the sound source 184 is the same as the sound source 284. In some examples, the configurer 144 updates the combined sound source representation 147 based on sounds of the sound sources 184 (e.g., the first environment) in response to determining that, although the sound sources 184 are distinct from the sound sources 284 (e.g., the environment 204), the sound sources 184 are the same sound source type (e.g., the same type of vehicle) as the sound sources 284.

Figure 3:
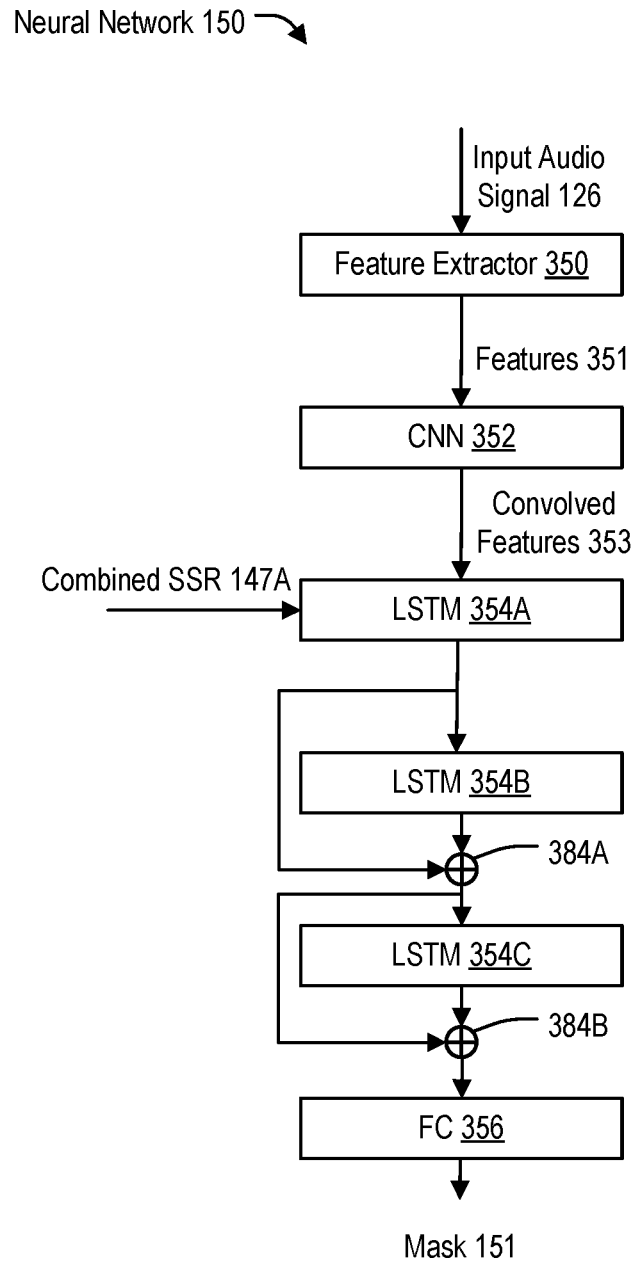
FIG. 3 is a diagram of an illustrative aspect of a neural network of the system of FIG. 1, in accordance with some examples of the present disclosure.

Referring to FIG. 3, an illustrative example of the neural network 150 is shown. In the example illustrated in FIG. 3, the neural network 150 includes a feature extractor 350 coupled to a CNN 352. The CNN 352 is coupled to an initial LSTM network layer, such as a LSTM 354A. An output of the LSTM 354A is coupled to an input of a fully connected (FC) layer 356.

In some implementations, the output of the LSTM 354A is coupled to the input of the fully connected layer 356 independently of (e.g., without) any additional intervening LSTM network layers. In some implementations, the output of the LSTM 354A is coupled via one or more LSTM combiner layers to the input of the fully connected layer 356. A LSTM combiner layer includes an LSTM network layer coupled to a combiner. For example, a first LSTM combiner layer includes a LSTM 354B coupled to a combiner 384A, and a second LSTM combiner layer includes a LSTM 354C coupled to a combiner 384B. The output of the LSTM 354A is coupled to an input of an LSTM network layer of an initial LSTM combiner layer. For example, the output of the LSTM 354A is coupled to an input of the LSTM 354B.

A combiner of a LSTM combiner layer combines an input of a LSTM network layer of the LSTM combiner layer with an output of the LSTM network layer to generate an output of the combiner. For example, the combiner 384A combines the input of the LSTM 354B (e.g., the output of the LSTM 354A) and the output of the LSTM 354B to generate an output. Each subsequent LSTM combiner layer receives an output of the previous LSTM combiner layer. For example, the LSTM 354C receives an output of the combiner 384A. The combiner 384B combines an input of the LSTM 354C (e.g., the output of the combiner 384A) and an output of the LSTM 354C to generate an output of the combiner 384B.

The fully connected layer 356 processes an output of a last LSTM combiner layer to generate an output of the neural network 150. For example, the fully connected layer 356 processes the output of the combiner 384B to generate the output of the neural network 150.

During operation, the feature extractor 350 receives a first portion (e.g., one or more audio frames of) the input audio signal 126. The feature extractor 350 extracts features 351 of the first portion of the input audio signal 126. In an illustrative example, the feature extractor 350 generates a spectrogram of the first portion of the input audio signal 126. In a particular aspect, the feature extractor 350 performs a FFT of sub-portions (e.g., corresponding 20 millisecond time windows) of the first portion to determine time-frequency information of the first portion. In this aspect, the features 351 are based on first FFT features associated with a first time window, second FFT features associated with a second time window, and so on. In some aspects, the features 351 include short-term spectral features, voice source features, spectro-temporal features, prosodic features, high-level features, or a combination thereof) that represent the sounds 186 of FIG. 1.

The CNN 352 processes the features 351 to generate convolved features 353. The CNN 352 takes account of temporal dependencies across time-sequenced portions of the input audio signal 126. For example, the CNN 352 includes one or more convolution layers that apply weights to sets of features received from the feature extractor 350 to generate the convolved features 353. In some implementations, higher weights are applied to more recently received sets of features (e.g., the features 351) to generate the convolved features 353.

In a particular aspect, the CNN 352 includes a one-dimensional CNN (e.g., 1D CNN) or a two-dimensional CNN (e.g., 2D CNN). For example, the 1D CNN reduces latency between receiving a portion of the input audio signal 126, generating the mask 151, and using the mask 151 to output a portion of the output audio signal 135. In some real-time low-latency examples (e.g., a voice call), the CNN 352 includes a 1D CNN. In some aspects, the 2D CNN corresponds to an improved accuracy of the output audio signal 135 in retaining or removing sounds corresponding to the selected sound sources 162 from the input audio signal 126. In some high-latency examples (e.g., a voice user interface), the CNN 352 includes a 2D CNN.

The LSTM 354A processes the convolved features 353 and the combined sound source representation 147A. In some examples, an input of the LSTM 354A corresponds to the convolved features 353 concatenated with the combined sound source representation 147A. In some implementations, the output of the LSTM 354A indicates one or more features of the convolved features 353 that have feature values matching corresponding feature values of the one or more features of the combined sound source representation 147A. The output of the LSTM 354A is provided, via any LSTM combiner layers, to the fully connected layer 356 to generate the mask 151.

Figure 4:
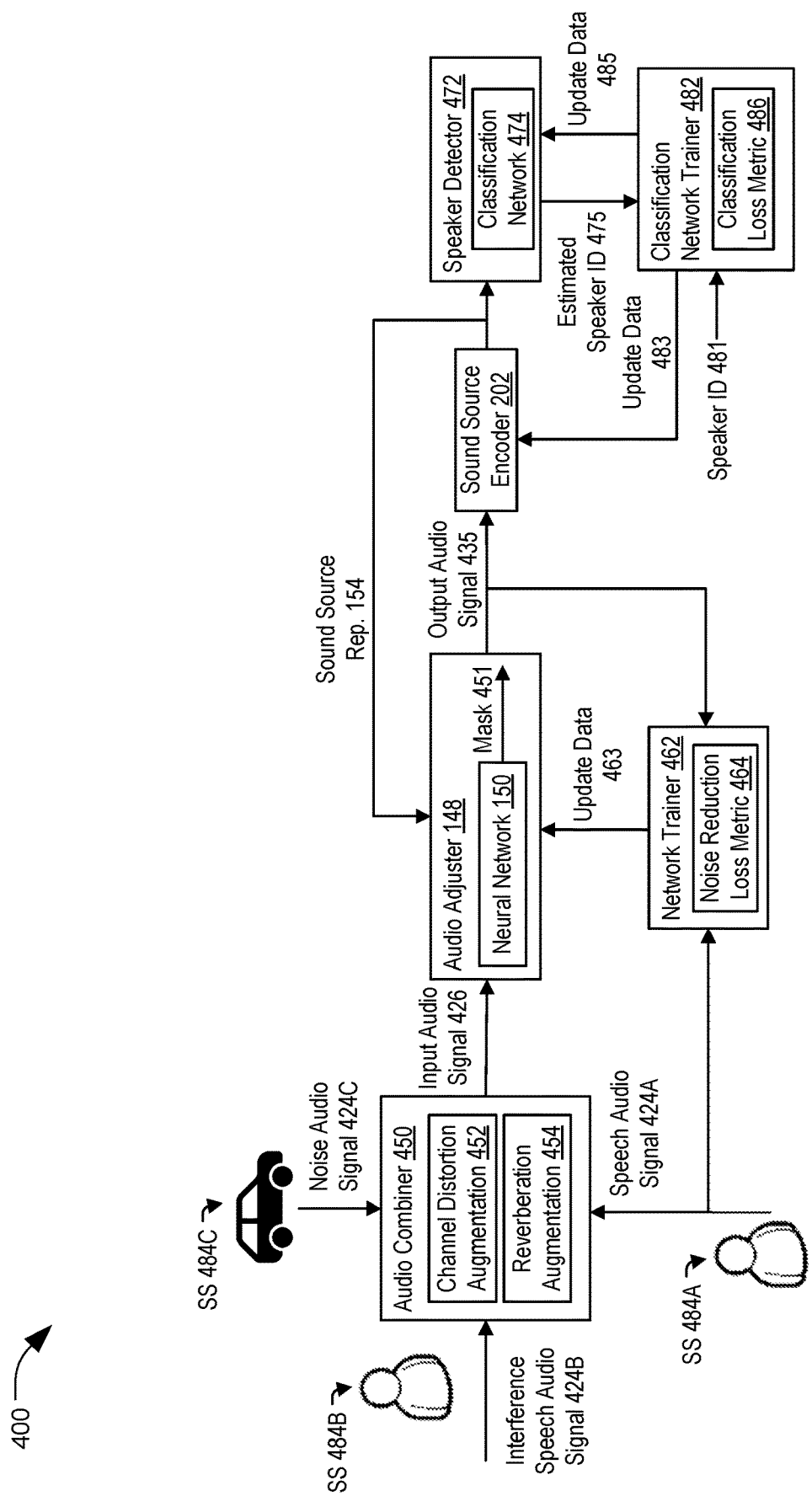
FIG. 4 is a diagram of an illustrative aspect of operations associated with joint training of a neural network and a sound source encoder of the system of FIG. 1, in accordance with some examples of the present disclosure.

Referring to FIG. 4, a diagram 400 of an illustrative aspect of operations associated with joint training of the neural network 150 and the sound source encoder 202 is shown.

An audio combiner 450 is coupled, via the audio adjuster 148, to the sound source encoder 202. The sound source encoder 202 is coupled to a speaker detector 472. A network trainer 462 is coupled to the audio adjuster 148 and a classification network trainer 482 is coupled to the sound source encoder 202 and the speaker detector 472.

During operation, the audio combiner 450 receives a speech audio signal 424A from a sound source 484A, an interference speech audio signal 424B from a sound source 484B, and a noise audio signal 424C from a sound source 484C. The audio combiner 450 generates an input audio signal 426 based on a combination of the speech audio signal 424A, the interference speech audio signal 424B, the noise audio signal 424C, one or more additional audio signals, or a combination thereof. In some aspects, the audio combiner 450 performs channel distortion augmentation 452, reverberation augmentation 454, or both, to update the input audio signal 426. In some aspects, the input audio signal 426 approximates various noise conditions (e.g., interference speech, noise, channel distortion, reverberation, or a combination thereof) that can be present when a speech audio signal that is of interest is received.

The audio combiner 450 provides the input audio signal 426 to the audio adjuster 148. The audio adjuster 148 receives a sound source representation 154 that represents the sound source 484A. The neural network 150 performs similar operations as described with reference to FIG. 3 to process a first input portion of the input audio signal 426 and the sound source representation 154 to generate a mask 451, where the input audio signal 426, the sound source representation 154, and the mask 451 correspond to the input audio signal 126, the combined sound source representation 147A, and the mask 151 of FIG. 3, respectively. The audio adjuster 148 applies the mask 451 to the first input portion to generate a first output portion of the output audio signal 435. The audio adjuster 148 applies the mask 451 to retain the sounds of the sound source 484A and to remove (or reduce) remaining sounds of the sound source 484B, the sound source 484C, the one or more additional audio signals, the channel distortion augmentation 452, the reverberation augmentation 454, or a combination thereof, from the first input portion to generate the first output portion.

The audio adjuster 148 provides the first output portion of the output audio signal 435 to the sound source encoder 202 and to the network trainer 462. The sound source encoder 202 processes the first output portion (e.g., corresponding to sounds of the sound source 484A retained from the first input portion) to generate an updated version of the sound source representation 154 of the sound source 484A. The sound source encoder 202 provides the updated version of the sound source representation 154 to the audio adjuster 148 to process a second input portion of the input audio signal 426. The sound source encoder 202 also provides the updated version of the sound source representation 154 to the speaker detector 472.

The speaker detector 472 uses a classification network 474 to process the updated version of the sound source representation 154 to generate an estimated speaker identifier 475. The speaker detector 472 provides the estimated speaker identifier 475 to the classification network trainer 482.

The network trainer 462 generates a noise reduction loss metric 464 based on a comparison of the first output portion of the output audio signal 435 and a corresponding first speech portion of the speech audio signal 424A. The first output portion corresponds to sounds of the sound source 484A retained from the input audio signal 426 and the first speech portion corresponds to original sounds of the sound source 484A. The network trainer 462 generates update data 463 based on the noise reduction loss metric 464. For example, the update data 463 indicates updates to weights, bias values, or a combination thereof, of the neural network 150, to reduce the noise reduction loss metric 464 in subsequent iterations. The network trainer 462 thus trains the neural network 150 over time to improve noise reduction and reduce a difference between the output audio signal 435 and the speech audio signal 424A.

The classification network trainer 482 determines a classification loss metric 486 based on the estimated speaker identifier 475 and a speaker identifier 481 of the sound source 484A. For example, the classification network trainer 482 retrieves a first sound source representation of a sound source (e.g., a person) associated with the estimated speaker identifier 475, retrieves a second sound source representation of the sound source 484A, and generates the classification loss metric 486 based on a comparison of the first sound source representation and the second sound source representation. In a particular aspect, the second sound source representation is previously generated based on sounds of the sound source 484A.

The classification network trainer 482 generates update data 483 and update data 485 based on the classification loss metric 486. For example, the update data 483 indicates updates to weights, bias values, or a combination thereof, of the sound source encoder 202 to reduce the classification loss metric 486. The classification network trainer 482 thus trains the sound source encoder 202 over time to generate the sound source representation 154 that more closely matches the second sound source representation. Similarly, the update data 485 indicates updates to weights, bias values, or a combination thereof, of the classification network 474 to reduce the classification loss metric 486. The classification network trainer 482 thus trains the classification network 474 over time to generate the estimated speaker identifier 475 that corresponds to a speaker with a sound source representation that more closely matches the second sound source representation. The network trainer 462 and the classification network trainer 482 thus jointly train the neural network 150, the sound source encoder 202, and the classification network 474.

In some implementations, the neural network 150, the sound source encoder 202, the classification network 474, or a combination thereof, are trained during a training phase and are designated as available for use when training is complete. For example, the network trainer 462 determines that training of the neural network 150 is complete in response to determining that the noise reduction loss metric 464 satisfies a training criterion (e.g., is less than a loss threshold). As another example, the classification network trainer 482 determines that training of the sound source encoder 202 and the classification network 474 is complete in response to determining that the classification loss metric 486 satisfies a training criterion (e.g., is less than a loss threshold).

In some aspects, the audio adjuster 148 is available for use when the network trainer 462 determines that training of the neural network 150 is complete. In some aspects, the sound source encoder 202 and the classification network 474 are available for use when the classification network trainer 482 determines that training of the sound source encoder 202 and the classification network 474 is complete.

In some implementations, the audio combiner 450, the network trainer 462, the speaker detector 472, the classification network trainer 482, or a combination thereof, are integrated in the device 102 of FIG. 1. In other implementations, the audio combiner 450, the network trainer 462, the classification network trainer 482, or a combination thereof, are integrated in a second device. In these implementations, the second device, in response to determining that the audio adjuster 148, the sound source encoder 202, the classification network 474, or a combination thereof are available for use, provides the neural network 150, the audio adjuster 148, the sound source encoder 202, the speaker detector 472, the classification network 474, or a combination thereof, to the device 102.

In some implementations, the neural network 150, the sound source encoder 202, the classification network 474, or a combination thereof, are trained (e.g., dynamically updated) during use. In these implementations, the input audio signal 426 corresponds to the input audio signal 126 of FIG. 1. In an illustrative example, the network trainer 462 receives the speech audio signal 424A from a first microphone that is closer to the sound source 484A (e.g., a known user having the speaker identifier 481), and the input audio signal 426 from one or more second microphones. The network trainer 462 trains the neural network 150 such that the output audio signal 435 matches the speech audio signal 424A (e.g., the noise reduction loss metric 464 is less than a loss threshold) and use the output audio signal 435 to generate the sound source representation 154 of the sound source 484A. The classification network trainer 482 uses the sound source representation 154 to train the sound source encoder 202 and the classification network 474. The network trainer 462 can use the sound source representation 154 and the trained version of the neural network 150 to retain or remove sounds of the sound source 484A to generate the output audio signal 135.

Figure 5:
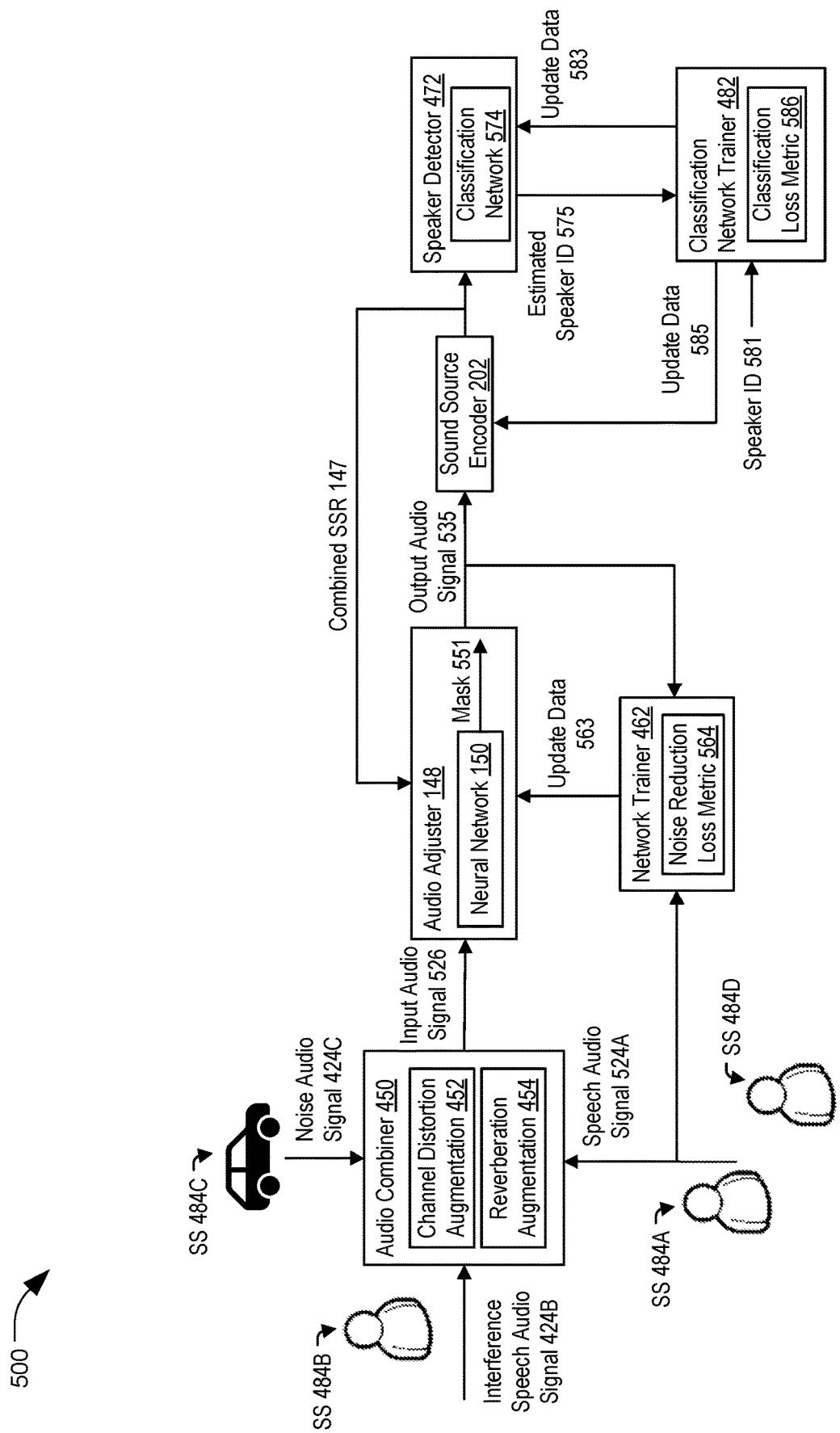
FIG. 5 is a diagram of another illustrative aspect of operations associated with joint training of a neural network and a sound source encoder of the system of FIG. 1, in accordance with some examples of the present disclosure.

Referring to FIG. 5, a diagram 500 of an illustrative aspect of operations associated with joint training of the neural network 150 and the sound source encoder 202 is shown.

During operation, the audio combiner 450 receives a speech audio signal 524A from the sound source 484A and a sound source 484D, the interference speech audio signal 424B from the sound source 484B, and the noise audio signal 424C from the sound source 484C. The audio combiner 450 generates an input audio signal 526 based on a combination of the speech audio signal 524A, the interference speech audio signal 424B, the noise audio signal 424C, one or more additional audio signals, or a combination thereof. In some aspects, the audio combiner 450 performs channel distortion augmentation 452, reverberation augmentation 454, or both, to update the input audio signal 526. In some aspects, the input audio signal 526 approximates various noise conditions (e.g., interference speech, noise, channel distortion, reverberation, or a combination thereof) that can be present when a speech audio signal that is of interest is received.

The audio combiner 450 provides the input audio signal 526 to the audio adjuster 148. The audio adjuster 148 receives a combined sound source representation 147 that represents the sound source 484A and the sound source 484D. The neural network 150 performs similar operations as described with reference to FIG. 3 to process a first input portion of the input audio signal 526 and the combined sound source representation 147 to generate a mask 551, where the input audio signal 526, the combined sound source representation 147, and the mask 551 correspond to the input audio signal 126, the combined sound source representation 147A, and the mask 151 of FIG. 3, respectively. The audio adjuster 148 applies the mask 551 to the first input portion to generate a first output portion of the output audio signal 535. The audio adjuster 148 applies the mask 551 to retain the sounds of the sound source 484A and the sound source 484D and to remove (or reduce) remaining sounds of the sound source 484B, the sound source 484C, the one or more additional audio signals, the channel distortion augmentation 452, the reverberation augmentation 454, or a combination thereof, from the first input portion to generate the first output portion.

The audio adjuster 148 provides the first output portion of the output audio signal 535 to the sound source encoder 202 and to the network trainer 462. The sound source encoder 202 processes the first output portion (e.g., corresponding to sounds of the sound source 484A and the sound source 484D retained from the first input portion) to generate an updated version of the combined sound source representation 147 of the sound source 484A and the sound source 484D. The sound source encoder 202 provides the updated version of the combined sound source representation 147 to the audio adjuster 148 to process a second input portion of the input audio signal 526. The sound source encoder 202 also provides the updated version of the combined sound source representation 147 to the speaker detector 472.

The speaker detector 472 uses a classification network 574 to process the updated version of the combined sound source representation 147 to generate an estimated speaker identifier 575. The speaker detector 472 provides the estimated speaker identifier 575 to the classification network trainer 482.

The network trainer 462 generates a noise reduction loss metric 564 based on a comparison of the first output portion of the output audio signal 535 and a corresponding first speech portion of the speech audio signal 524A. The first output portion corresponds to sounds of the sound source 484A and the sound source 484D retained from the input audio signal 526 and the first speech portion corresponds to original sounds of the sound source 484A and the sound source 484D. The network trainer 462 generates update data 563 based on the noise reduction loss metric 564. For example, the update data 563 indicates updates to weights, bias values, or a combination thereof, of the neural network 150, to reduce the noise reduction loss metric 564 in subsequent iterations. The network trainer 462 thus trains the neural network 150 over time to improve noise reduction and reduce a difference between the output audio signal 535 and the speech audio signal 524A.

The classification network trainer 482 determines a classification loss metric 586 based on the estimated speaker identifier 575 and a speaker identifier 581 of the sound source 484A and the sound source 484D. For example, the classification network trainer 482 retrieves a first combined sound source representation of a first pair of sound sources (e.g., two people) associated with the estimated speaker identifier 575, and a second combined sound source representation of the sound source 484A and the sound source 484D. The classification network trainer 482 generates the classification loss metric 486 based on a comparison of the first combined sound source representation and the second combined sound source representation. In a particular aspect, the second combined sound source representation is previously generated based on sounds of the sound source 484A and the sound source 484D.

The classification network trainer 482 generates update data 583 and update data 585 based on the classification loss metric 586. For example, the update data 583 indicates updates to weights, bias values, or a combination thereof, of the sound source encoder 202 to reduce the classification loss metric 586. The classification network trainer 482 thus trains the sound source encoder 202 over time to generate the combined sound source representation 147 that more closely matches the second combined sound source representation. Similarly, the update data 585 indicates updates to weights, bias values, or a combination thereof, of the classification network 574 to reduce the classification loss metric 586. The classification network trainer 482 thus trains the classification network 574 over time to generate the estimated speaker identifier 575 that corresponds to a pair of speakers with a combined sound source representation that more closely matches the second combined sound source representation. The network trainer 462 and the classification network trainer 482 thus jointly train the neural network 150, the sound source encoder 202, and the classification network 574.

In some implementations, the neural network 150, the sound source encoder 202, the classification network 474, or a combination thereof, are trained during a training phase and are designated as available for use when training is complete. For example, the network trainer 462 determines that training of the neural network 150 is complete in response to determining that the noise reduction loss metric 564 satisfies a training criterion (e.g., is less than a loss threshold). As another example, the classification network trainer 482 determines that training of the sound source encoder 202 and the classification network 574 is complete in response to determining that the classification loss metric 586 satisfies a training criterion (e.g., is less than a loss threshold).

In some aspects, the audio adjuster 148 is available for use when the network trainer 462 determines that training of the neural network 150 is complete. In some aspects, the sound source encoder 202 and the classification network 574 are available for use when the classification network trainer 482 determines that training of the sound source encoder 202 and the classification network 574 is complete.

In some implementations, the audio combiner 450, the network trainer 462, the speaker detector 472, the classification network trainer 482, or a combination thereof, are integrated in the device 102 of FIG. 1. In other implementations, the audio combiner 450, the network trainer 462, the classification network trainer 482, or a combination thereof, are integrated in a second device. In these implementations, the second device, in response to determining that the audio adjuster 148, the sound source encoder 202, the classification network 574, or a combination thereof are available for use, provides the neural network 150, the audio adjuster 148, the sound source encoder 202, the speaker detector 472, the classification network 574, or a combination thereof, to the device 102.

In some implementations, the neural network 150, the sound source encoder 202, the classification network 474, or a combination thereof, are trained (e.g., dynamically updated) during use. In these implementations, the input audio signal 526 corresponds to the input audio signal 126 of FIG. 1. In an illustrative example, the network trainer 462 receives the speech audio signal 524A from a first microphone that is closer to the sound source 484A and the sound source 484D (e.g., a known pair of sound sources having a speaker identifier 581), and the input audio signal 526 from one or more second microphones. The network trainer 462 trains the neural network 150 such that the output audio signal 535 matches the speech audio signal 524A (e.g., the noise reduction loss metric 564 is less than a loss threshold) and use the output audio signal 535 to generate the combined sound source representation 147 of the sound source 484A and the sound source 484D. The classification network trainer 482 uses the combined sound source representation 147 to train the sound source encoder 202 and the classification network 574. The network trainer 462 can use the sound source representation 154 and the trained version of the neural network 150 to retain or remove sounds of the sound source 484A and the sound source 484D to generate the output audio signal 135.

Figure 6:
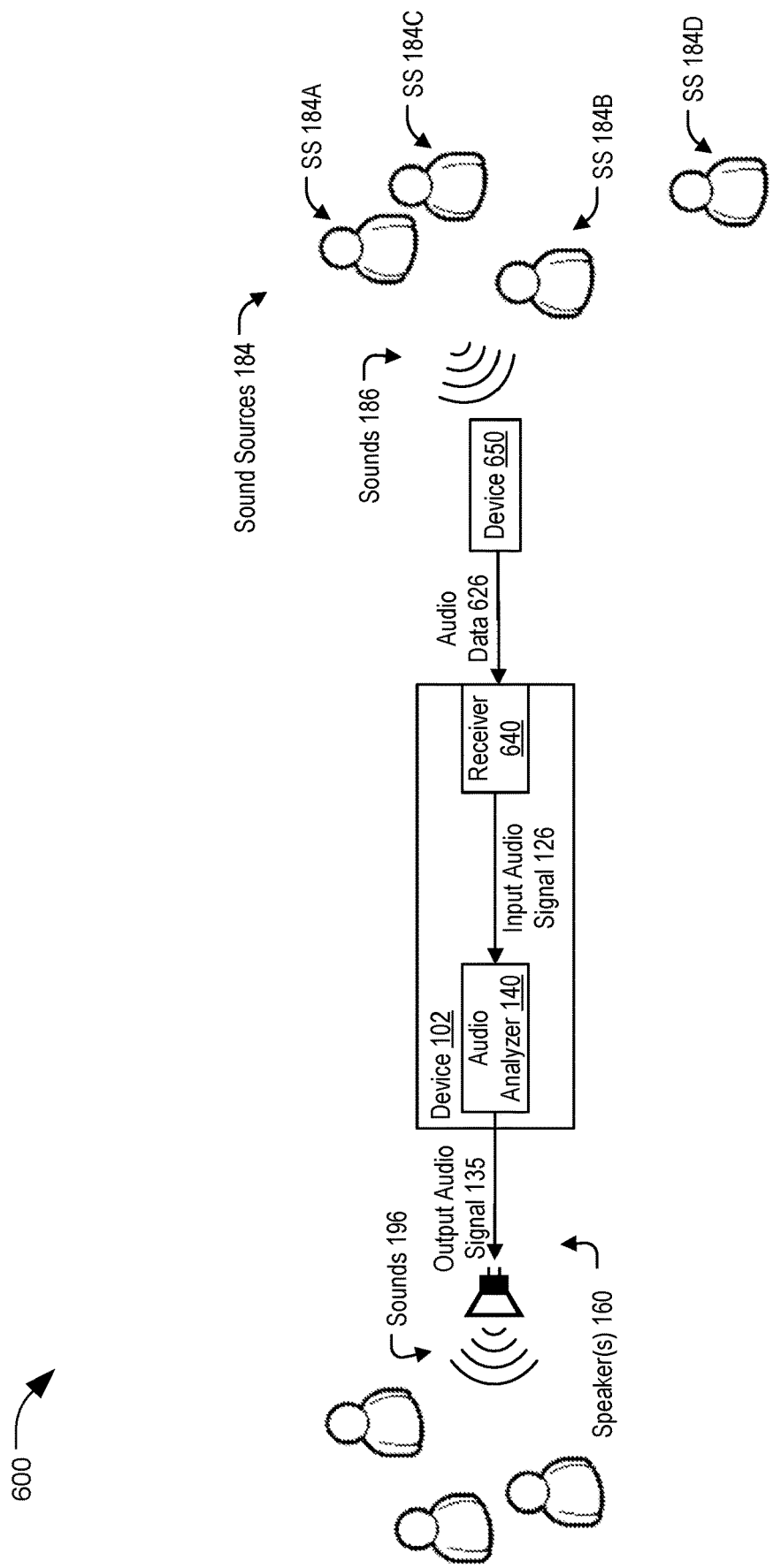
FIG. 6 illustrates an example of a device operable to use sound source representations to process audio received from another device, in accordance with some examples of the present disclosure.

Referring to FIG. 6, a diagram 600 is shown of the device 102 operable to receive audio data 626 from a device 650 and to use sound source representations to process the audio data 626. The device 102 includes the audio analyzer 140 coupled to a receiver 640.

During operation, the receiver 640 receives audio data 626 from the device 650. The audio data 626 represents the input audio signal 126. For example, the audio data 626 represents the sounds 186 of the sound sources 184. In some implementations, the audio data 626 corresponds to encoded audio data and a decoder of the device 102 decodes the audio data 626 to generate the input audio signal 126.

As described with reference to FIG. 1, the audio analyzer 140 processes the input audio signal 126 based on the combined sound source representation 147A to generate the output audio signal 135. The audio analyzer 140 provides the output audio signal 135 to the one or more speakers 160 to output the sounds 196.

Figure 7:
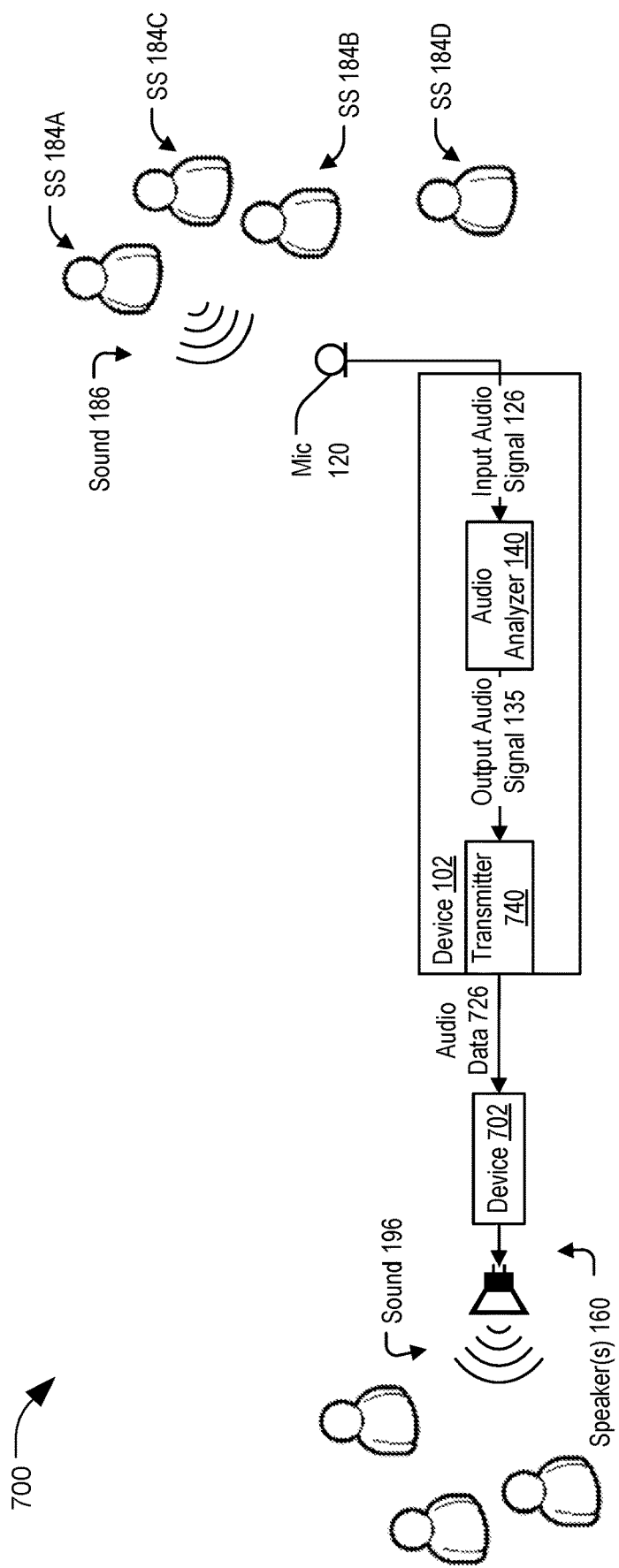
FIG. 7 illustrates an example of a device operable to transmit to another device audio that is processed based on sound source representations, in accordance with some examples of the present disclosure.

Referring to FIG. 7, a diagram 700 is shown of the device 102 operable to use sound source representations to process the input audio signal 126 to generate the output audio signal 135, to generate audio data 726 based on the output audio signal 135, and to transmit the audio data 726 to the device 702. The device 102 includes the audio analyzer 140 coupled to a transmitter 740.

During operation, the audio analyzer 140 receives the input audio signal 126 corresponding to a microphone output of the one or more microphones 120. The input audio signal 126 represents the sounds 186 of the sound sources 184 captured by the one or more microphones 120. As described with reference to FIG. 1, the audio analyzer 140 uses the combined sound source representation 147A to process the input audio signal 126 to generate the output audio signal 135.

The transmitter 740 transmits audio data 726 to the device 702. The audio data 726 is based on the output audio signal 135. In some examples, the audio data 726 corresponds to encoded audio data and an encoder of the device 102 encodes the output audio signal 135 to generate the audio data 726.

A decoder of the device 702 decodes the audio data 726 to generate a decoded audio signal. The device 702 provides the decoded audio signal to the one or more speakers 160 to output the sounds 196.

In some implementations, the device 702 is the same as the device 650. For example, the device 102 receives the audio data 626 from a second device and outputs the sounds 196 via the one or more speakers 160 while concurrently capturing the sounds 186 via the one or more microphones 120 and sending the audio data 726 to the second device.

Figure 8:
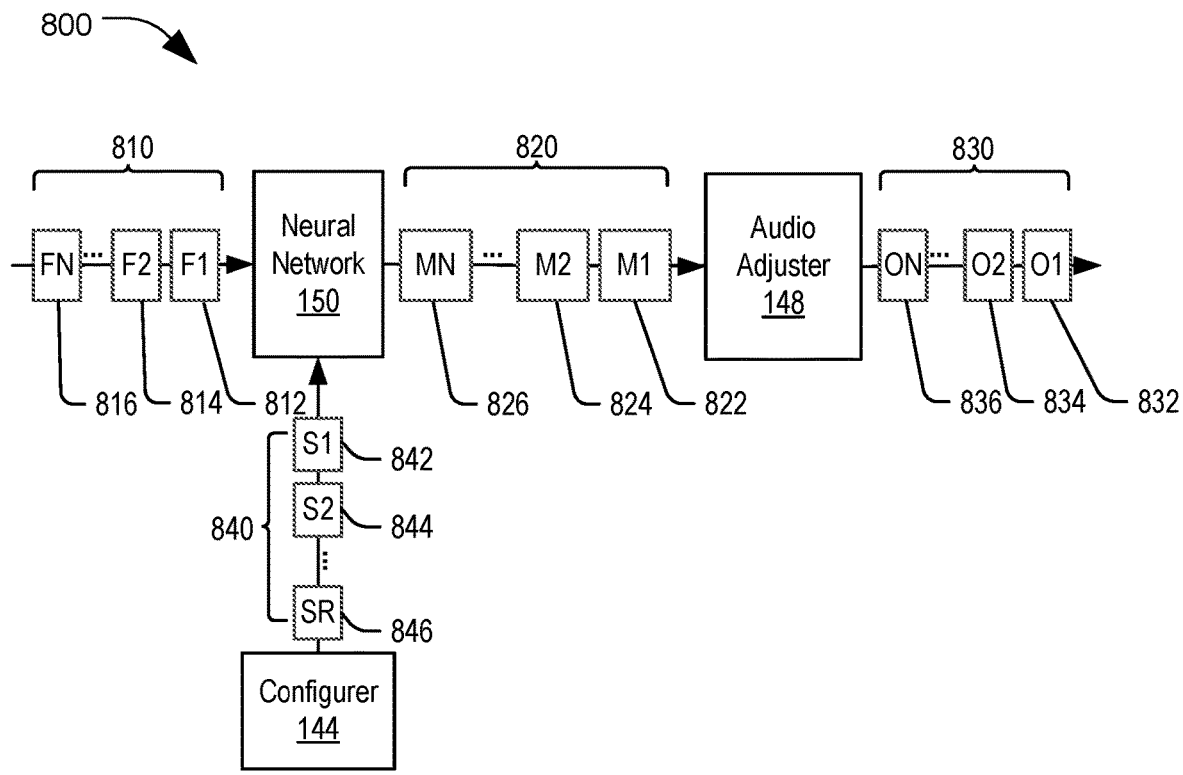
FIG. 8 is a diagram of an illustrative aspect of operation of components of the system of FIG. 1, in accordance with some examples of the present disclosure.

FIG. 8 is a diagram of an illustrative aspect of operation of components of the system of FIG. 1, in accordance with some examples of the present disclosure. The neural network 150 is configured to receive a sequence 810 of audio data samples, such as a sequence of successively captured frames of the input audio signal 126, illustrated as a first frame (F1) 812, a second frame (F2) 814, and one or more additional frames including an Nth frame (FN) 816 (where N is an integer greater than two). The neural network 150 is also configured to receive a sequence 840 of sound source representations, such as a sequence of combined sound source representations including the combined sound source representation 147A, illustrated as a first sound source representation (S1) 842, a second sound source representation (S2) 844, and one or more additional sound source representations including an Rth sound source representation (SR) 846 (where R is an integer greater than two and less than or equal to N). The neural network 150 is configured to output a sequence 820 of masks including a first mask (M1) 822, a second mask (M2) 824, and one or more additional masks including an Nth mask (MN) 826.

The neural network 150 is configured to receive the sequence 810 of audio data samples and to adaptively use the sequence 840 of sound source representations to generate a mask (e.g., the second mask 824) of the sequence 820 corresponding to a frame (e.g., the second frame (F2) 814) of the sequence 810 at least partially based on a prior frame (e.g., the first frame (F1) 812) of audio data samples in the sequence 810. As an illustrative, non-limiting example, the neural network 150 may include a CNN.

The audio adjuster 148 is configured to apply a mask (e.g., the first mask (M1) 822) of the sequence 820 to a corresponding frame (e.g., the first frame (F1) 812) of the sequence 810 to generate a frame (e.g., a first frame (O1) 832) of a sequence 830 of audio data samples, such as a sequence of successive frames of the output audio signal 135, illustrated as the first frame (O1) 832, a second frame (O2) 834, and one or more additional frames including an Nth frame (ON) 836 (where N is an integer greater than two).

During operation, the neural network 150 uses the first sound source representation (S1) 842 to process the first frame (F1) 812 to generate the first mask (M1) 822, and the audio adjuster 148 applies the first mask (M1) 822 to the first frame (F1) 812 to generate the first frame (O1) 832 of the sequence 830 of audio data samples. The neural network 150 uses the second sound source representation (S2) 844 to process the second frame (F2) 814 to generate the second mask (M2) 824, and the audio adjuster 148 applies the second mask (M2) 824 to the second frame (F2) 814 to generate the second frame (O2) 834 of the sequence 830 of audio data samples. In some implementations, the second mask (M2) 824 is based on the second frame (F2) 814 and at least partially based on the first frame (F1) 812 of the audio data samples. Such processing continues, including the neural network 150 using the Nth sound source representation (SR) 846 to process the Nth frame (FN) 816 to generate the Nth mask (MN) 826, and the audio adjuster 148 applying the Nth mask (MN) 826 to the Nth frame (FN) 816 to generate the Nth frame (ON) 836 of the sequence 830 of audio data samples.

In some implementations, the configurer 144 provides a SSR to the neural network 150 to process each frame of the sequence 810 of audio data samples (e.g., the integer R is equal to the integer N). In some examples, if the one or more selected sound sources 162 remain the same from the first frame (F1) 812 to the second frame (F2) 814, the second sound source representation (S2) 844 is the same as the first sound source representation (S1) 842 or is an updated (e.g., dynamically trained) version of the first sound source representation (S1) 842.

In some implementations, the configurer 144 provides a SSR to the neural network 150 at a different rate than a rate at which frames of the sequence 810 of audio data samples are processed by the neural network 150. For example, the configurer 144 provides one SSR to the neural network 150 for every four frames of the sequence 810 of audio data samples (e.g., the integer N is equal to 4 times the integer R). To illustrate, the neural network 150 uses the first sound source representation (S1) 842 to process first four frames of the sequence 810 of audio data samples, uses the second sound source representation (S2) 844 to process second four frames of the sequence 810 of audio data samples, and so on. If the one or more selected sound sources 162 is the same for the first frame and the fifth frame, the second sound source representation (S2) 844 is the same as the first sound source representation (S1) 842 or is an updated (e.g., dynamically trained) version of the first sound source representation (S1) 842.

In some implementations, the configurer 144 provides a SSR to the neural network 150 in response to a change in the one or more selected sound sources 162. To illustrate, if the one or more selected sound sources 162 remain the same while processing the sequence 810 of audio data samples, the configurer 144 provides only the first sound source representation (S1) 842 to the neural network 150 (e.g., the integer R is equal to 1) and the neural network 150 uses the first sound source representation (S1) 842 to process all frames of the sequence 810 of audio data samples.

In some implementations, the Nth mask (MN) 826 is based on the Nth frame (FN) 816 and at least partially based on one or more of the previous frames of audio data samples of the sequence 810. By dynamically generating the mask based on one or more prior frames of audio data samples, accuracy of audio adjustment by the audio adjuster 148 may be improved for audio (e.g., speech, music, etc.) that may span multiple frames of audio data.

Figure 9:
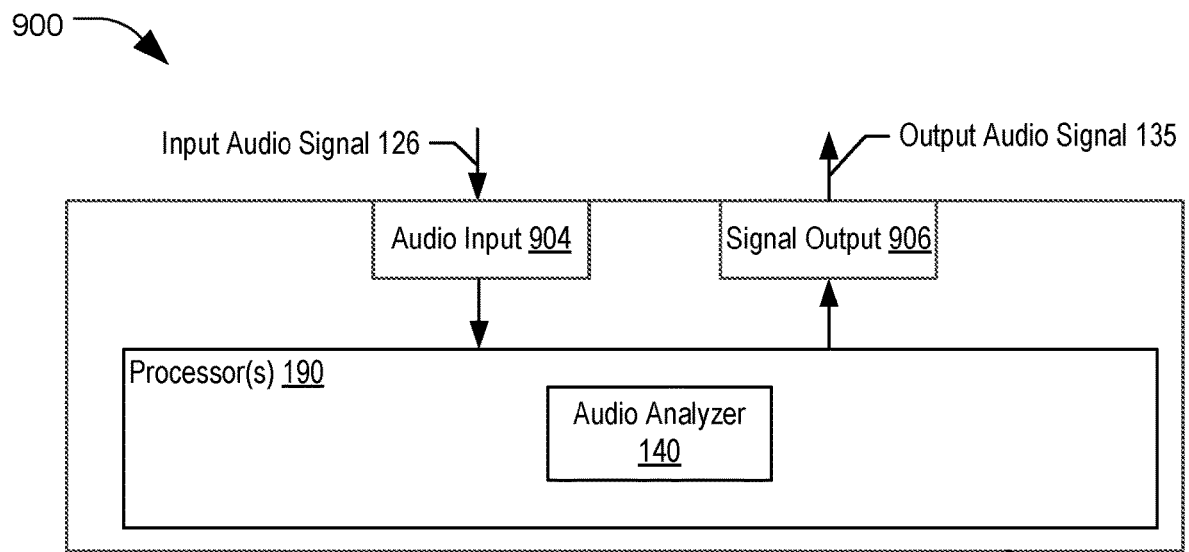
FIG. 9 illustrates an example of an integrated circuit operable to process audio based on sound source representations, in accordance with some examples of the present disclosure.
Figure 11:
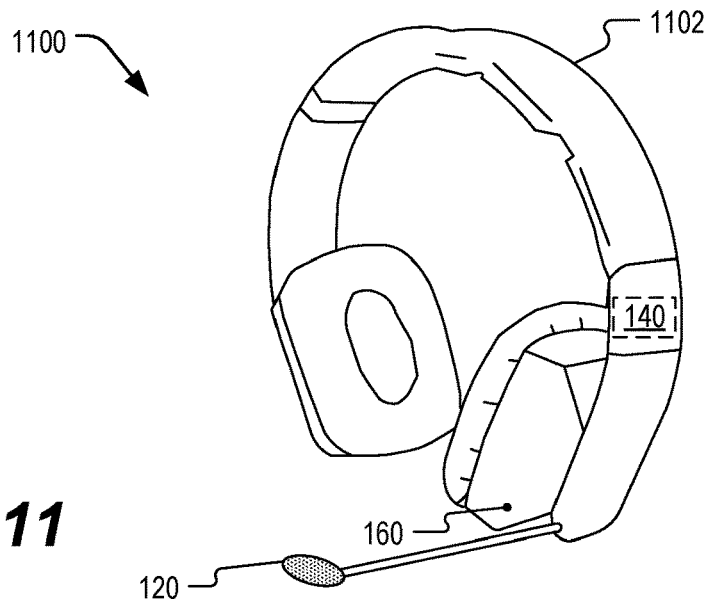
FIG. 11 is a diagram of a headset operable to process audio based on sound source representations, in accordance with some examples of the present disclosure.
Figure 12:
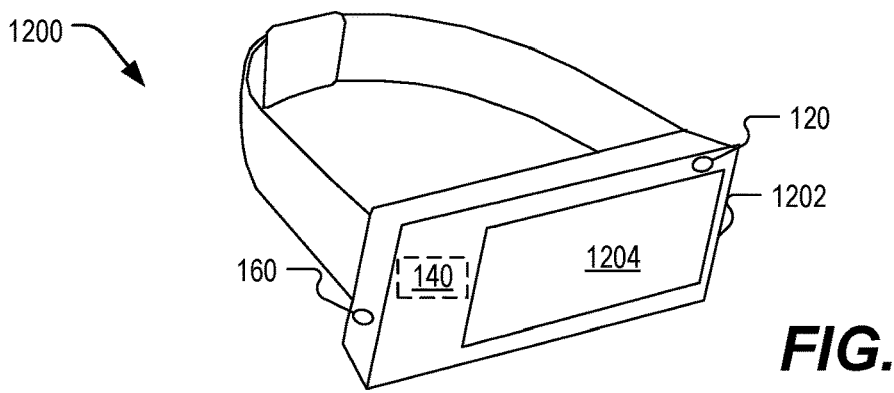
FIG. 12 is a diagram of a wearable electronic device operable to process audio based on sound source representations, in accordance with some examples of the present disclosure.
Figure 13:
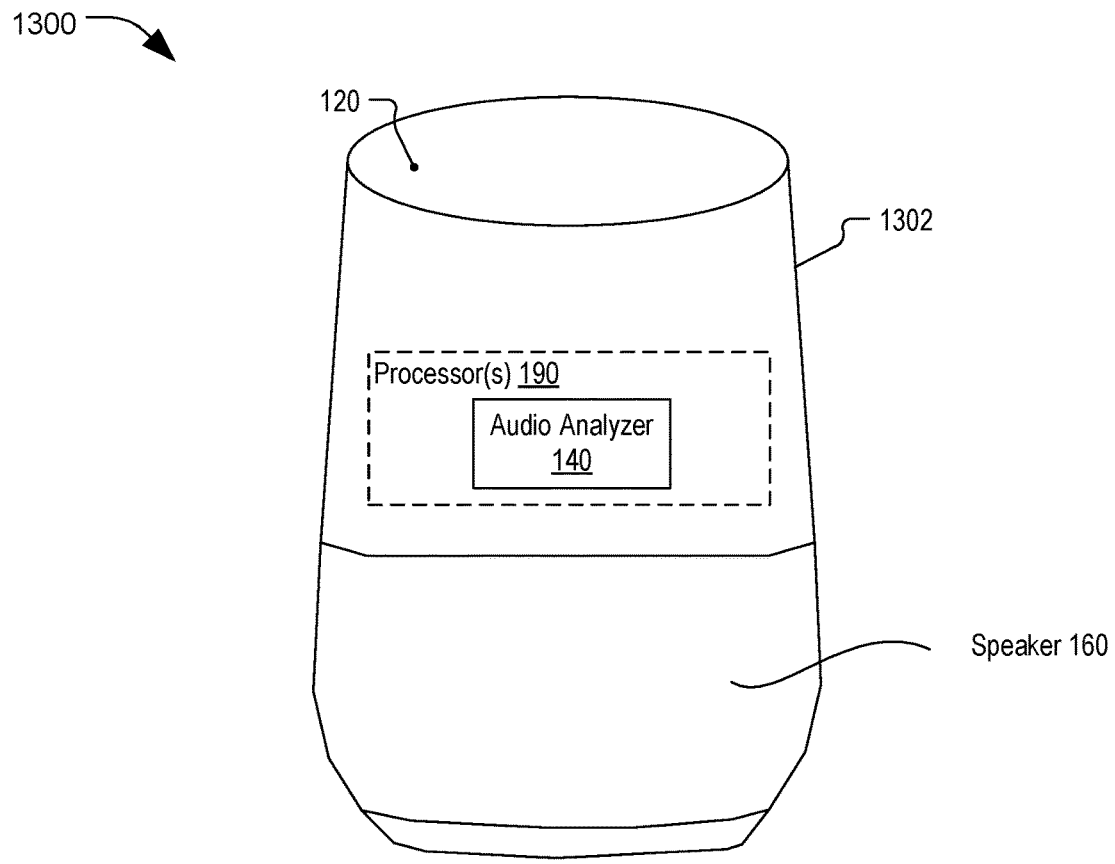
FIG. 13 is a diagram of a voice-controlled speaker system operable to process audio based on sound source representations, in accordance with some examples of the present disclosure.
Figure 14:
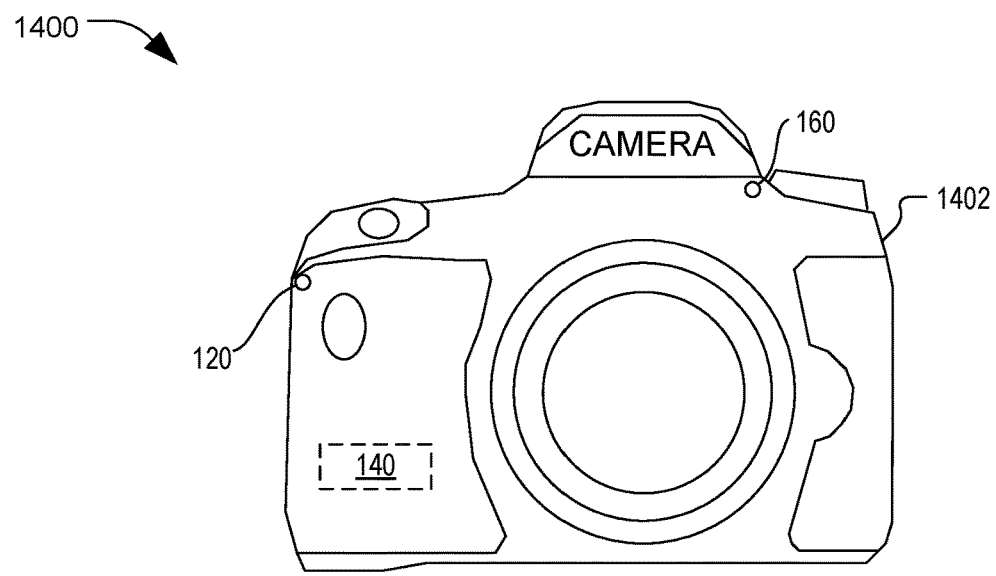
FIG. 14 is a diagram of a camera operable to process audio based on sound source representations, in accordance with some examples of the present disclosure.
Figure 15:
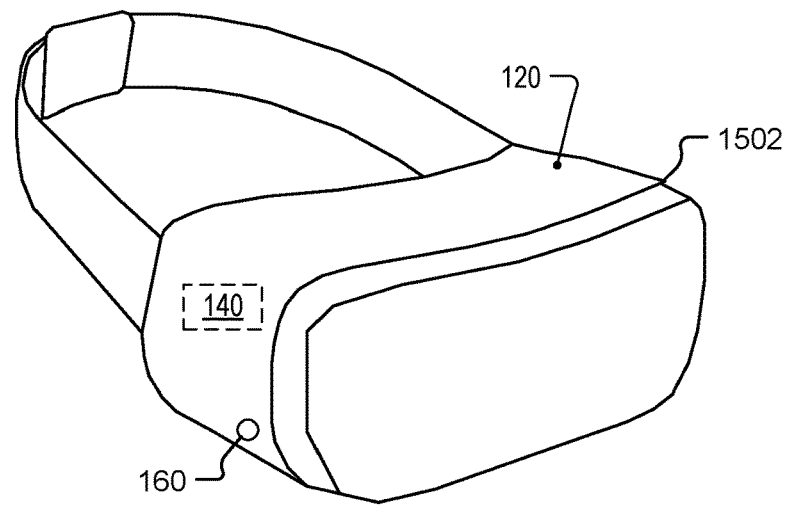
FIG. 15 is a diagram of a headset, such as a virtual reality, mixed reality, or augmented reality headset, operable to process audio based on sound source representations, in accordance with some examples of the present disclosure.
Figure 16:
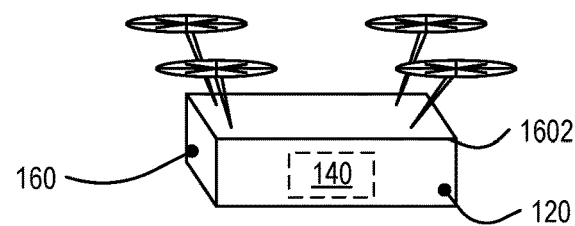
FIG. 16 is a diagram of a first example of a vehicle operable to process audio based on sound source representations, in accordance with some examples of the present disclosure.
Figure 17:
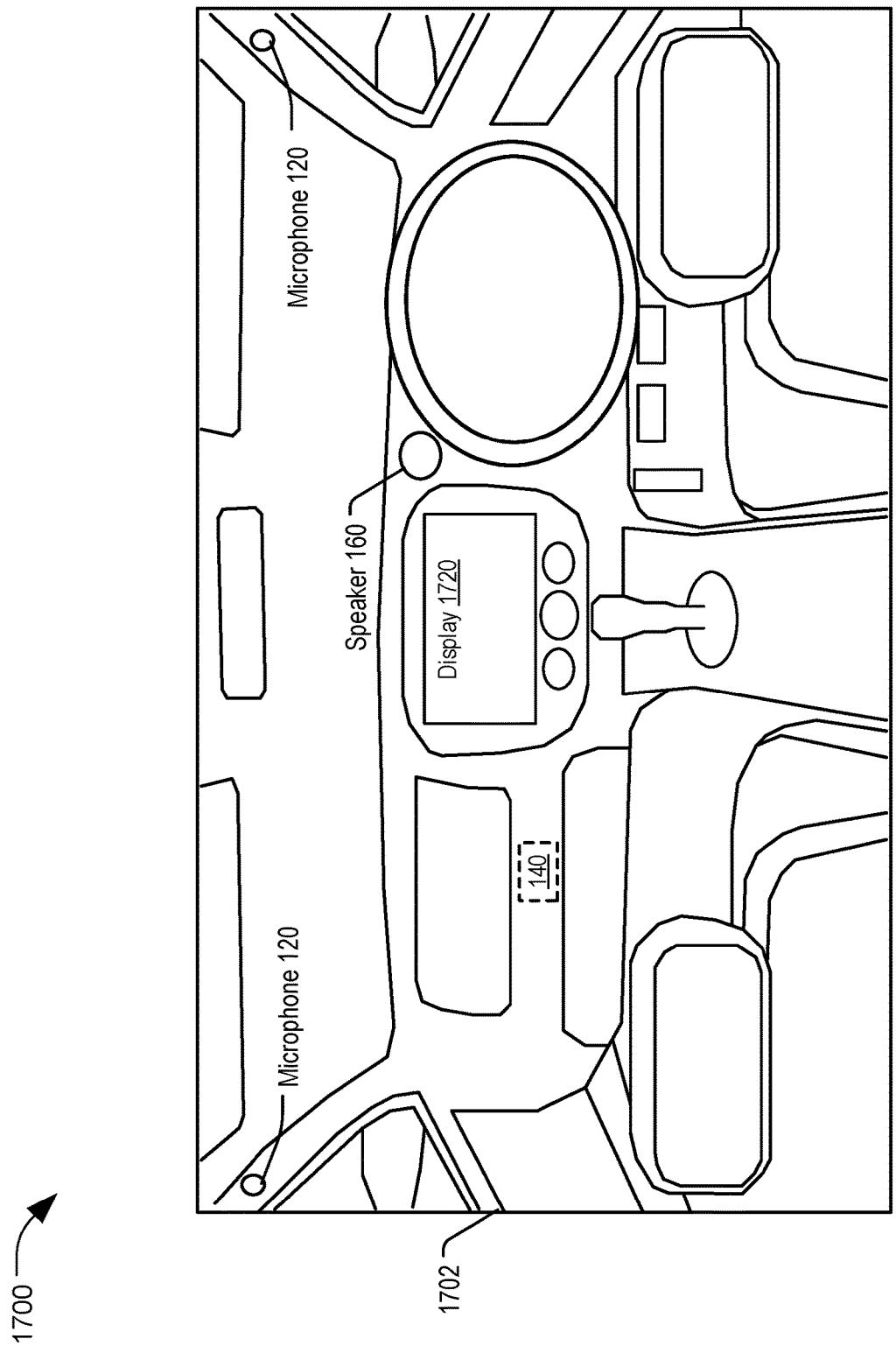
FIG. 17 is a diagram of a second example of a vehicle operable to process audio based on sound source representations, in accordance with some examples of the present disclosure.

FIG. 9 depicts an implementation 900 of the device 102 as an integrated circuit 902 that includes the one or more processors 190. The integrated circuit 902 also includes an audio input 904, such as one or more bus interfaces, to enable the input audio signal 126 to be received for processing. The integrated circuit 902 also includes a signal output 906, such as a bus interface, to enable sending of an output signal, such as the output audio signal 135. The integrated circuit 902 enables implementation of processing audio based on sound source representations as a component in a system that includes microphones, such as a mobile phone or tablet as depicted in FIG. 10, a headset as depicted in FIG. 11, a wearable electronic device as depicted in FIG. 12, a voice-controlled speaker system as depicted in FIG. 13, a camera as depicted in FIG. 14, a virtual reality, mixed reality, or augmented reality headset as depicted in FIG. 15, or a vehicle as depicted in FIG. 16 or FIG. 17.

Figure 10:
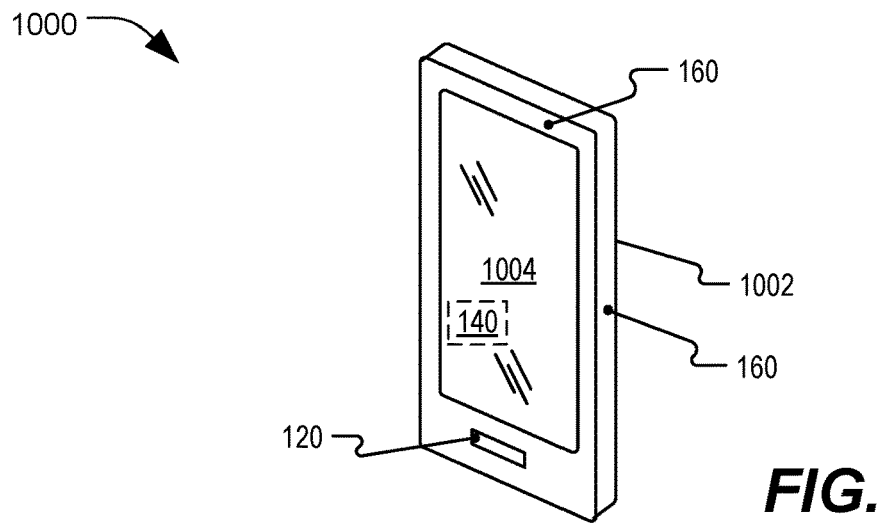
FIG. 10 is a diagram of a mobile device operable to process audio based on sound source representations, in accordance with some examples of the present disclosure.

FIG. 10 depicts an implementation 1000 in which the device 102 includes a mobile device 1002, such as a phone or tablet, as illustrative, non-limiting examples. The mobile device 1002 includes the one or more microphones 120, the one or more speakers 160, and a display screen 1004. Components of the one or more processors 190, including the audio analyzer 140, are integrated in the mobile device 1002 and are illustrated using dashed lines to indicate internal components that are not generally visible to a user of the mobile device 1002.

In a particular example, the audio analyzer 140 operates to process an input audio signal 126 using sound source representations to generate an output audio signal 135. In a particular aspect, the input audio signal 126 is based on microphone output of the one or more microphones 120, and the audio analyzer 140 provides audio data based on the output audio signal 135 to another device (not shown), such as the device 702 of FIG. 7.

In a particular aspect, the input audio signal 126 can be based on audio data received from another device (not shown), such as the device 650 of FIG. 6. In some implementations, the audio analyzer 140 provides the output audio signal 135 to the one or more speakers 160 for playback. In some implementations, the output audio signal 135 is processed to perform one or more operations at the mobile device 1002, such as to launch a graphical user interface or otherwise display other information associated with the user's speech at the display screen 1004 (e.g., via an integrated "smart assistant" application).

FIG. 11 depicts an implementation 1100 in which the device 102 includes a headset device 1102. The headset device 1102 includes the one or more microphones 120, the one or more speakers 160, or a combination thereof. Components of the one or more processors 190, including the audio analyzer 140, are integrated in the headset device 1102. In a particular example, the audio analyzer 140 operates to process an input audio signal 126 using sound source representations to generate an output audio signal 135. In a particular aspect, the input audio signal 126 can be based on microphone output of the one or more microphones 120, and the audio analyzer 140 provides audio data based on the output audio signal 135 to another device (not shown), such as the device 702 of FIG. 7, for further processing.

In a particular aspect, the input audio signal 126 can be based on audio data received from another device (not shown), such as the device 650 of FIG. 6. In some implementations, the audio analyzer 140 provides the output audio signal 135 to the one or more speakers 160 for playback. In some implementations, the output audio signal 135 is processed to perform one or more operations at the headset device 1102.

FIG. 12 depicts an implementation 1200 in which the device 102 includes a wearable electronic device 1202, illustrated as a "smart watch." The audio analyzer 140, the one or more microphones 120, and the one or more speakers 160 are integrated into the wearable electronic device 1202. In a particular example, the audio analyzer 140 operates to process an input audio signal 126 using sound source representations to generate an output audio signal 135. In a particular aspect, the input audio signal 126 is based on microphone output of the one or more microphones 120, and the audio analyzer 140 provides audio data based on the output audio signal 135 to another device (not shown), such as the device 702 of FIG. 7.

In a particular aspect, the input audio signal 126 can be based on audio data received from another device (not shown), such as the device 650 of FIG. 6. In some implementations, the audio analyzer 140 provides the output audio signal 135 to the one or more speakers 160 for playback. In some implementations, the output audio signal 135 is processed to perform one or more operations at the wearable electronic device 1202, such as to launch a graphical user interface or otherwise display other information associated with the user's speech at a display screen 1204 of the wearable electronic device 1202. To illustrate, the wearable electronic device 1202 may include a display screen that is configured to display a notification based on user speech detected in the output audio signal 135 by the wearable electronic device 1202. In a particular example, the wearable electronic device 1202 includes a haptic device that provides a haptic notification (e.g., vibrates) in response to detection of user voice activity. For example, the haptic notification can cause a user to look at the wearable electronic device 1202 to see a displayed notification indicating detection of a keyword spoken by the user. The wearable electronic device 1202 can thus alert a user with a hearing impairment or a user wearing a headset that the user's voice activity is detected.

FIG. 13 is an implementation 1300 in which the device 102 includes a wireless speaker and voice activated device 1302. The wireless speaker and voice activated device 1302 can have wireless network connectivity and is configured to execute an assistant operation. The one or more processors 190 including the audio analyzer 140, the one or more microphones 120, the one or more speakers 160, or a combination thereof, are included in the wireless speaker and voice activated device 1302.

In a particular example, the audio analyzer 140 operates to process an input audio signal 126 using sound source representations to generate an output audio signal 135. In a particular aspect, the input audio signal 126 can be based on microphone output of the one or more microphones 120, and the audio analyzer 140 provides audio data based on the output audio signal 135 to another device (not shown), such as the device 702 of FIG. 7, for further processing.

In a particular aspect, the input audio signal 126 can be based on audio data received from another device (not shown), such as the device 650 of FIG. 6. In some implementations, the audio analyzer 140 provides the output audio signal 135 to the one or more speakers 160 for playback. In some implementations, the output audio signal 135 is processed to perform one or more operations at the wireless speaker and voice activated device 1302. For example, in response to detecting a verbal command in the output audio signal 135, the wireless speaker and voice activated device 1302 can execute assistant operations, such as via execution of a voice activation system (e.g., an integrated assistant application). The assistant operations can include adjusting a temperature, playing music, turning on lights, etc. For example, the assistant operations are performed responsive to receiving a command after a keyword or key phrase (e.g., "hello assistant").

FIG. 14 depicts an implementation 1400 in which the device 102 includes a portable electronic device that corresponds to a camera device 1402. The audio analyzer 140, the one or more microphones 120, the one or more speakers 160, or a combination thereof, are included in the camera device 1402.

In a particular example, the audio analyzer 140 operates to process an input audio signal 126 using sound source representations to generate an output audio signal 135. In a particular aspect, the input audio signal 126 can be based on microphone output of the one or more microphones 120, and the audio analyzer 140 provides audio data based on the output audio signal 135 to another device (not shown), such as the device 702 of FIG. 7, for further processing.

In a particular aspect, the input audio signal 126 can be based on audio data received from another device (not shown), such as the device 650 of FIG. 6. In some implementations, the audio analyzer 140 provides the output audio signal 135 to the one or more speakers 160 for playback. In some implementations, the output audio signal 135 is processed to perform one or more operations at the camera device 1402. For example, in response to detecting a verbal command in the output audio signal 135, the camera device 1402 can execute operations responsive to spoken user commands, such as to adjust image or video capture settings, image or video playback settings, or image or video capture instructions, as illustrative examples.

FIG. 15 depicts an implementation 1500 in which the device 102 includes a portable electronic device that corresponds to a virtual reality, mixed reality, or augmented reality headset 1502. The audio analyzer 140, the one or more microphones 120, the one or more speakers 160, or a combination thereof, are integrated into the headset 1502. In a particular aspect, the headset 1502 includes a first microphone 120 positioned to primarily capture speech of a user and a second microphone 120 positioned to primarily capture environmental sounds.

In a particular example, the audio analyzer 140 operates to process an input audio signal 126 using sound source representations to generate an output audio signal 135. In a particular aspect, the input audio signal 126 can be based on microphone output of the one or more microphones 120, and the audio analyzer 140 provides audio data based on the output audio signal 135 to another device (not shown), such as the device 702 of FIG. 7, for further processing.

In a particular aspect, the input audio signal 126 can be based on audio data received from another device (not shown), such as the device 650 of FIG. 6. In some implementations, the audio analyzer 140 provides the output audio signal 135 to the one or more speakers 160 for playback. In some implementations, the output audio signal 135 is processed to perform one or more operations at the headset 1502. A visual interface device is positioned in front of the user's eyes to enable display of augmented reality, mixed reality, or virtual reality images or scenes to the user while the headset 1502 is worn. In a particular example, the visual interface device is configured to display a notification indicating user speech detected in the output audio signal 135.

FIG. 16 depicts an implementation 1600 in which the device 102 corresponds to, or is integrated within, a vehicle 1602, illustrated as a manned or unmanned aerial device (e.g., a package delivery drone). The audio analyzer 140, the one or more microphones 120, the one or more speakers 160, or a combination thereof, are integrated into the vehicle 1602.

In a particular example, the audio analyzer 140 operates to process an input audio signal 126 using sound source representations to generate an output audio signal 135. In a particular aspect, the input audio signal 126 can be based on microphone output of the one or more microphones 120, and the audio analyzer 140 provides audio data based on the output audio signal 135 to another device (not shown), such as the device 702 of FIG. 7, for further processing.

In a particular aspect, the input audio signal 126 can be based on audio data received from another device (not shown), such as the device 650 of FIG. 6. In some implementations, the audio analyzer 140 provides the output audio signal 135 to the one or more speakers 160 for playback. In some implementations, the output audio signal 135 is processed to perform one or more operations at the vehicle 1602. For example, user voice activity detection can be performed based on the output audio signal 135, such as for delivery instructions from an authorized user of the vehicle 1602.

FIG. 17 depicts another implementation 1700 in which the device 102 corresponds to, or is integrated within, a vehicle 1702, illustrated as a car. The vehicle 1702 includes the one or more processors 190 including the audio analyzer 140. The vehicle 1702 also includes the one or more microphones 120, the one or more speakers 160, or a combination thereof.

In a particular example, the audio analyzer 140 operates to process an input audio signal 126 using sound source representations to generate an output audio signal 135. In a particular aspect, the input audio signal 126 can be based on microphone output of the one or more microphones 120, and the audio analyzer 140 provides audio data based on the output audio signal 135 to another device (not shown), such as the device 702 of FIG. 7, for further processing. In an illustrative example, a combined sound source representation 147 represents sounds 298 of sound sources 284 of a first environment, as described with reference to FIG. 2C. The audio analyzer 140, in response to determining that a second environment of the vehicle 1702 matches the first environment associated with the combined sound source representation 147, processes the input audio signal 126 using the combined sound source representation 147 to remove background noise to generate the output audio signal 135.

In a particular aspect, the audio analyzer 140 determines that the first environment matches the second environment in response to determining that the first environment is associated with a first vehicle that matches the vehicle 1702, is associated with a first operational state of the first vehicle that matches a second operational state of the vehicle 1702, is associated with one or more first external conditions that match one or more second external conditions of the vehicle 1702, or a combination thereof.

In a particular aspect, the audio analyzer 140 determines that the first vehicle matches the vehicle 1702 in response to determining that the first vehicle is the same as the vehicle 1702. In another aspect, the audio analyzer 140 determines that the first vehicle matches the vehicle 1702 in response to determining that the first vehicle is the same vehicle model (e.g., Polestar®, a registered trademark of Polestar Holding, Sweden), the same year of manufacture (e.g., 2022), the same vehicle type (e.g., electrical SUV), or a combination thereof. In a particular aspect, an operational state of a vehicle can include speed, reversing, turning, braking, etc. In a particular aspect, external conditions of a vehicle can include a type of road (e.g., highway, dirt road, suburban road, metropolitan roadway), weather conditions (e.g., wind, rain, storms), traffic conditions (e.g., heavy traffic, medium traffic, no traffic), etc.

In a particular aspect, the input audio signal 126 can be based on audio data received from another device (not shown), such as the device 650 of FIG. 6. In some implementations, the audio analyzer 140 provides the output audio signal 135 to the one or more speakers 160 for playback. In some implementations, the output audio signal 135 is processed to perform one or more operations at the vehicle 1702. For example, user voice activity detection can be performed based on the output audio signal 135. In some implementations, user voice activity detection can be performed based on an input audio signal 126 received from interior microphones (e.g., the one or more microphones 120), such as for a voice command from an authorized passenger. For example, the input audio signal 126 includes sounds from a sound source 184A, such as a voice command from an authorized user of the vehicle 1702 (e.g., a parent) to set a volume to 5 or to set a destination for a self-driving vehicle. The input audio signal 126 also includes sounds from a sound source 184B, such as a voice command from an unauthorized user of the vehicle 1702 (e.g., a child) to set a volume to 9. The input audio signal 126 can also include sounds from a sound source 184C, such as other passengers discussing another location.

The audio analyzer 140 can process the input audio signal 126 to retain sounds from the sound source 184A and to remove sounds from the sound source 184B and the sound source 184C to generate the output audio signal 135, and user voice activity detection can be performed on the output audio signal 135 to detect the voice command (e.g., from the parent to set a volume to 5 or to set a destination for a self-driving vehicle) from the authorized user.

In some implementations, user voice activity detection can be performed based on an input audio signal 126 received from external microphones (e.g., the one or more microphones 120), such as an authorized user of the vehicle. In a particular implementation, a voice activation system initiates one or more operations of the vehicle 1702 based on one or more keywords (e.g., "unlock," "start engine," "play music," "display weather forecast," or another voice command) detected in the output audio signal 135, such as by providing feedback or information via a display 1720 or the one or more speakers 160.

Figure 18:
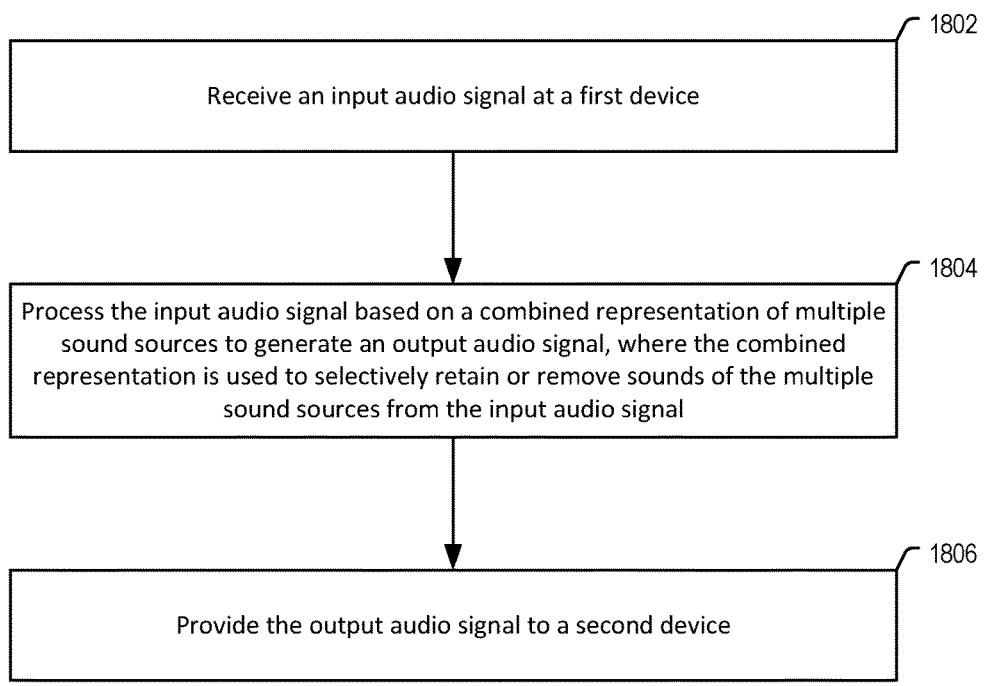
FIG. 18 is a diagram of a particular implementation of a method of processing audio based on sound source representations that may be performed by the device of FIG. 1, in accordance with some examples of the present disclosure.

Referring to FIG. 18, a particular implementation of a method 1800 of processing audio based on sound source representations is shown. In a particular aspect, one or more operations of the method 1800 are performed by at least one of the configurer 144, the SSR generator 146, the audio adjuster 148, the neural network 150, the audio analyzer 140, the one or more processors 190, the device 102, the system 100 of FIG. 1, the feature extractor 350, the CNN 352, the LSTM 354A, the LSTM 354B, the LSTM 354C, the fully connected layer 356 of FIG. 3, the audio combiner 450 of FIG. 4, the receiver 640 of FIG. 6, the transmitter 740 of FIG. 7, or a combination thereof.

The method 1800 includes receiving an input audio signal at a first device, at 1802. For example, the audio analyzer 140 receives the input audio signal 126 at the device 102. In some implementations, the input audio signal 126 is based on microphone output of the one or more microphones 120. In some implementations, the input audio signal 126 is based on the audio data 626 received from the device 650, as described with reference to FIG. 6.

The method 1800 also includes processing the input audio signal based on a combined representation of multiple sound sources to generate an output audio signal, where the combined representation is used to selectively retain or remove sounds of the multiple sound sources from the input audio signal, at 1804. For example, the audio analyzer 140 processes the input audio signal 126 based on the combined sound source representation 147A of the sound source 184A and the sound source 184B to generate the output audio signal 135, as described with reference to FIG. 1. The audio analyzer 140 selectively, based on the retain flag 145 of the adjuster configuration setting 143, uses the combined sound source representation 147A to retain or remove sounds of the sound source 184A and the sound source 184B from the input audio signal 126.

The method 1800 further includes providing the output audio signal to a second device, at 1806. For example, the audio adjuster 148 provides the output audio signal 135 to the one or more speakers 160, as described with reference to FIG. 1. As another example, the audio adjuster 148 provides the output audio signal 135 to the transmitter 740 to transmit the audio data 726 to the device 702. The audio data 726 is based on (e.g., is an encoded version of) the output audio signal 135.

The method 1800 enhances the perception of sounds of interest in the output audio signal 135 by retaining the sounds of interest or removing the remaining sounds. Using the combined sound source representation 147A representing sounds of the selected sound sources 162 can improve efficiency and accuracy of processing the input audio signal 126 to generate the output audio signal 135.

The method 1800 of FIG. 18 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 1800 of FIG. 18 may be performed by a processor that executes instructions, such as described with reference to FIG. 19.

Figure 19:
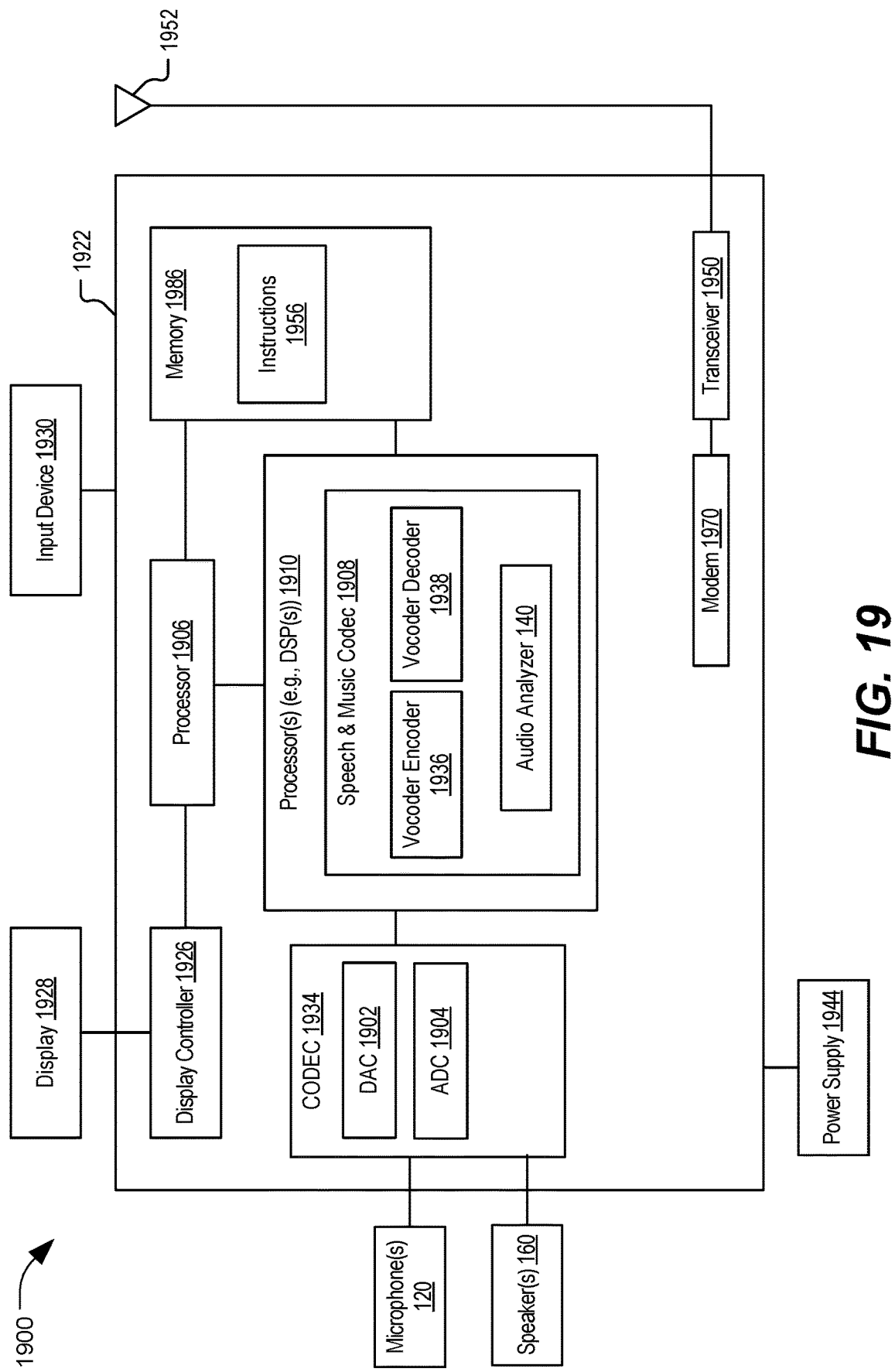
FIG. 19 is a block diagram of a particular illustrative example of a device that is operable to process audio based on sound source representations, in accordance with some examples of the present disclosure.

Referring to FIG. 19, a block diagram of a particular illustrative implementation of a device is depicted and generally designated 1900. In various implementations, the device 1900 may have more or fewer components than illustrated in FIG. 19. In an illustrative implementation, the device 1900 may correspond to the device 102. In an illustrative implementation, the device 1900 may perform one or more operations described with reference to FIGS. 1-18.

In a particular implementation, the device 1900 includes a processor 1906 (e.g., a CPU). The device 1900 may include one or more additional processors 1910 (e.g., one or more DSPs). In a particular aspect, the one or more processors 190 of FIG. 1 correspond to the processor 1906, the processors 1910, or a combination thereof. The processors 1910 may include a speech and music coder-decoder (CODEC) 1908 that includes a voice coder ("vocoder") encoder 1936, a vocoder decoder 1938, the audio analyzer 140, or a combination thereof.

The device 1900 may include a memory 1986 and a CODEC 1934. The memory 1986 may include instructions 1956, that are executable by the one or more additional processors 1910 (or the processor 1906) to implement the functionality described with reference to the audio analyzer 140. The device 1900 may include the modem 1970 coupled, via a transceiver 1950, to an antenna 1952. In a particular aspect, the memory 1986 includes the memory 132 of FIG. 1. In a particular aspect, the transceiver 1950 includes the receiver 640 of FIG. 6, the transmitter 740 of FIG. 7, or both.

The device 1900 may include a display 1928 coupled to a display controller 1926. The one or more microphones 120, the one or more speakers 160, or a combination thereof, may be coupled to the CODEC 1934. The CODEC 1934 may include a digital-to-analog converter (DAC) 1902, an analog-to-digital converter (ADC) 1904, or both. In a particular implementation, the CODEC 1934 may receive analog signals from the one or more microphones 120, convert the analog signals to digital signals using the analog-to-digital converter 1904, and provide the digital signals to the speech and music codec 1908. The speech and music codec 1908 may process the digital signals, and the digital signals may further be processed by the audio analyzer 140. In a particular implementation, the audio analyzer 140 of the speech and music codec 1908 may provide digital signals to the CODEC 1934. The CODEC 1934 may convert the digital signals to analog signals using the digital-to-analog converter 1902 and may provide the analog signals to the one or more speakers 160.

In a particular implementation, the device 1900 may be included in a system-in-package or system-on-chip device 1922. In a particular implementation, the memory 1986, the processor 1906, the processors 1910, the display controller 1926, the CODEC 1934, and the modem 1970 are included in a system-in-package or system-on-chip device 1922. In a particular implementation, an input device 1930 and a power supply 1944 are coupled to the system-on-chip device 1922. Moreover, in a particular implementation, as illustrated in FIG. 19, the display 1928, the input device 1930, the one or more microphones 120, the one or more speakers 160, the antenna 1952, and the power supply 1944 are external to the system-on-chip device 1922. In a particular implementation, each of the display 1928, the input device 1930, the one or more microphones 120, the one or more speakers 160, the antenna 1952, and the power supply 1944 may be coupled to a component of the system-on-chip device 1922, such as an interface or a controller.

The device 1900 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

In conjunction with the described implementations, an apparatus includes means for receiving an input audio signal at a first device. For example, the means for receiving can correspond to the audio adjuster 148, the neural network 150, the audio analyzer 140, the one or more processors 190, the device 102, the system 100 of FIG. 1, the receiver 640 of FIG. 6, the CODEC 1934, the analog-to-digital converter 1904, the speech and music codec 1908, the antenna 1952, the transceiver 1950, the modem 1970, the processor 1906, the one or more processors 1910, the device 1900 of FIG. 19, one or more other circuits or components configured to receive an input audio signal, or any combination thereof.

The apparatus also includes means for processing the input audio signal based on a combined representation of multiple sound sources to generate an output audio signal, wherein the combined representation is used to selectively retain or remove sounds of the multiple sound sources from the input audio signal. For example, the means for processing can correspond to the audio adjuster 148, the neural network 150, the audio analyzer 140, the one or more processors 190, the device 102, the system 100 of FIG. 1, the speech and music codec 1908, the processor 1906, the one or more processors 1910, the device 1900 of FIG. 19, one or more other circuits or components configured to process the input audio signal based on a combined representation of multiple sound sources, or any combination thereof.

The apparatus further includes means for providing the output audio signal to a second device. For example, the means for providing can correspond to the audio adjuster 148, the neural network 150, the audio analyzer 140, the one or more processors 190, the device 102, the system 100 of FIG. 1, the transmitter 740 of FIG. 7, the CODEC 1934, the digital-to-analog converter 1902, the speech and music codec 1908, the antenna 1952, the transceiver 1950, the modem 1970, the processor 1906, the one or more processors 1910, the device 1900 of FIG. 19, one or more other circuits or components configured to provide an output audio signal to a second device, or any combination thereof.

In some implementations, a non-transitory computer-readable medium (e.g., a computer-readable storage device, such as the memory 132 or the memory 1986) stores instructions (e.g., the instructions 1956) that, when executed by one or more processors (e.g., the one or more processors 190, the one or more processors 1910, or the processor 1906), cause the one or more processors to receive an input audio signal (e.g., the input audio signal 126) at a first device (e.g., the device 102). The instructions, when executed by the one or more processors, also cause the one or more processors to process the input audio signal based on a combined representation (e.g., the combined sound source representation 147A) of multiple sound sources (e.g., the sound source 184A and the sound source 184B) to generate an output audio signal (e.g., the output audio signal 135). The combined representation is used to selectively retain or remove sounds of the multiple sound sources from the input audio signal. The instructions, when executed by the one or more processors, further cause the one or more processors to provide the output audio signal to a second device (e.g., the one or more speakers 160 or the device 702).

Particular aspects of the disclosure are described below in sets of interrelated Examples:

According to Example 1, a device includes: one or more processors configured to: receive an input audio signal; process the input audio signal based on a combined representation of multiple sound sources to generate an output audio signal, wherein the combined representation is used to selectively retain or remove sounds of the multiple sound sources from the input audio signal; and provide the output audio signal to a second device.

Example 2 includes the device of Example 1, wherein the one or more processors are configured to, based on a retain flag having a first value, use the combined representation to retain the sounds of the multiple sound sources and to remove other sounds of one or more additional sound sources from the input audio signal.

Example 3 includes the device of Example 2, wherein the one or more processors are configured to, responsive to a detected condition indicating that processing of the input audio signal is to be initiated, set the retain flag to have the first value indicating that the sounds of the multiple sound sources are to be retained, wherein the first value of the retain flag is based on a user input, a default configuration, a configuration input from an application, a configuration request from another device, or a combination thereof.

Example 4 includes the device of any of Example 1 to Example 3, wherein the multiple sound sources include one or more authorized users.

Example 5 includes the device of any of Example 1 to Example 4, wherein the multiple sound sources include an emergency vehicle.

Example 6 includes the device of any of Example 1 to Example 5, wherein the one or more processors are configured to, based on a retain flag having a second value, use the combined representation to remove the sounds of the multiple sound sources and to retain other sounds of one or more additional sound sources from the input audio signal.

Example 7 includes the device of Example 6, wherein the one or more processors are configured to, responsive to a detected condition indicating that processing of the input audio signal is to be initiated, set the retain flag to have the second value indicating that the sounds of the multiple sound sources are to be removed, wherein the second value of the retain flag is based on a user input, a default configuration, a configuration input from an application, a configuration request from another device, or a combination thereof.

Example 8 includes the device of any of Example 1 to Example 7, wherein the multiple sound sources include traffic, wind, reverberation, channel distortion, another non-speech sound source, a person, or a combination thereof.

Example 9 includes the device of any of Example 1 to Example 8, wherein the multiple sound sources are associated with background noise in a particular environment.

Example 10 includes the device of Example 9, wherein the particular environment corresponds to an interior of a particular type of vehicle.

Example 11 includes the device of any of Example 1 to Example 10, wherein the combined representation is based on particular sounds from particular sound sources, and wherein a particular sound source is a same sound source type as one of the multiple sound sources.

Example 12 includes the device of any of Example 1 to Example 11, wherein the one or more processors are further configured to update the combined representation based on the sounds of any of the multiple sound sources.

Example 13 includes the device of any of Example 1 to Example 12, wherein the one or more processors are further configured to, based on a combination setting, generate the combined representation based on individual representations of the multiple sound sources.

Example 14 includes the device of Example 13, wherein the one or more processors are further configured to update the combination setting based on a user input, a detected condition, or both.

Example 15 includes the device of any of Example 1 to Example 14, wherein the multiple sound sources include at least a first sound source and a second sound source, wherein a first representation of the first sound source indicates a first value of a particular feature, wherein a second representation of the second sound source indicates a second value of the particular feature, and wherein a value of the particular feature indicated by the combined representation is based on the first value and the second value.

Example 16 includes the device of Example 15, wherein the first representation includes one or more spectrograms that are based on sounds from a particular sound source that is of the same type as the first sound source.

Example 17 includes the device of Example 15 or Example 16, wherein the combined representation corresponds to a concatenation of a first representation of the first sound source with a second representation of the second sound source.

Example 18 includes the device of any of Example 1 to Example 17, wherein the input audio signal is processed using a neural network to generate the output audio signal.

Example 19 includes the device of Example 18, wherein the neural network includes a convolutional neural network (CNN), an autoregressive (AR) generative network, an audio generative network (AGN), an attention network (AN), a long short-term memory (LSTM) network, or a combination thereof.

Example 20 includes the device of Example 18 or Example 19, further including a sound source encoder configured to process sounds from one or more sound sources to generate a representation of the one or more sound sources, wherein the sound source encoder and the neural network are jointly trained.

Example 21 includes the device of any of Example 1 to Example 20, further including a receiver configured to receive audio data representing the input audio signal.

Example 22 includes the device of any of Example 1 to Example 21, further comprising a transmitter configured to transmit audio data to the second device, the audio data based on the output audio signal.

According to Example 23, a method includes: receiving an input audio signal at a first device; processing the input audio signal based on a combined representation of multiple sound sources to generate an output audio signal, wherein the combined representation is used to selectively retain or remove sounds of the multiple sound sources from the input audio signal; and providing the output audio signal to a second device.

Example 24 includes the method of Example 23, wherein, based on a retain flag having a first value, the combined representation is used to retain the sounds of the multiple sound sources and to remove other sounds of one or more additional sound sources from the input audio signal.

Example 25 includes the method of Example 24, further including, responsive to a detected condition indicating that processing of the input audio signal is to be initiated, setting the retain flag to have the first value indicating that the sounds of the multiple sound sources are to be retained, wherein the first value of the retain flag is based on a user input, a default configuration, a configuration input from an application, a configuration request from another device, or a combination thereof.

Example 26 includes the method of any of Example 23 to Example 25, wherein the multiple sound sources include one or more authorized users.

Example 27 includes the method of any of Example 23 to Example 26, wherein the multiple sound sources include an emergency vehicle.

Example 28 includes the method of any of Example 23 to Example 27, wherein, based on a retain flag having a second value, the combined representation is used to remove the sounds of the multiple sound sources and to retain other sounds of one or more additional sound sources from the input audio signal.

Example 29 includes the method of Example 28, further including, responsive to a detected condition indicating that processing of the input audio signal is to be initiated, setting the retain flag to have the second value indicating that the sounds of the multiple sound sources are to be removed, wherein the second value of the retain flag is based on a user input, a default configuration, a configuration input from an application, a configuration request from another device, or a combination thereof.

Example 30 includes the method of any of Example 23 to Example 29, wherein the multiple sound sources include traffic, wind, reverberation, channel distortion, another non-speech sound source, a person, or a combination thereof.

Example 31 includes the method of any of Example 23 to Example 30, wherein the multiple sound sources are associated with background noise in a particular environment.

Example 32 includes the method of Example 31, wherein the particular environment corresponds to an interior of a particular type of vehicle.

Example 33 includes the method of any of Example 23 to Example 32, wherein the combined representation is based on particular sounds from particular sound sources, and wherein a particular sound source is a same sound source type as one of the multiple sound sources.

Example 34 includes the method of any of Example 23 to Example 33, further including updating the combined representation based on the sounds of any of the multiple sound sources.

Example 35 includes the method of any of Example 23 to Example 34, further including, based on a combination setting, generating the combined representation based on individual representations of the multiple sound sources.

Example 36 includes the method of Example 35, further including updating the combination setting based on a user input, a detected condition, or both.

Example 37 includes the method of any of Example 23 to Example 36, wherein the multiple sound sources include at least a first sound source and a second sound source, wherein a first representation of the first sound source indicates a first value of a particular feature, wherein a second representation of the second sound source indicates a second value of the particular feature, and wherein a value of the particular feature indicated by the combined representation is based on the first value and the second value.

Example 38 includes the method of Example 37, wherein the first representation includes one or more spectrograms that are based on sounds from a particular sound source that is of the same type as the first sound source.

Example 39 includes the method of Example 37 or Example 38, wherein the combined representation corresponds to a concatenation of a first representation of the first sound source with a second representation of the second sound source.

Example 40 includes the method of any of Example 23 to Example 39, wherein the input audio signal is processed using a neural network to generate the output audio signal.

Example 41 includes the method of Example 40, wherein the neural network includes a convolutional neural network (CNN), an autoregressive (AR) generative network, an audio generative network (AGN), an attention network (AN), a long short-term memory (LSTM) network, or a combination thereof.

Example 42 includes the method of Example 40 or Example 41, further including using a sound source encoder to process sounds from one or more sound sources to generate a representation of the one or more sound sources, wherein the sound source encoder and the neural network are jointly trained.

According to Example 43, a device includes: a memory configured to store instructions; and a processor configured to execute the instructions to perform the method of any of Example 23 to Example 42.

According to Example 44, a non-transitory computer-readable medium stores instructions that, when executed by a processor, cause the processor to perform the method of any of Example 23 to Example 42.

According to Example 45, an apparatus includes means for carrying out the method of any of Example 23 to Example 42.

According to Example 46, a non-transitory computer-readable medium stores instructions that, when executed by one or more processors, cause the one or more processors to: receive an input audio signal at a first device; process the input audio signal based on a combined representation of multiple sound sources to generate an output audio signal, wherein the combined representation is used to selectively retain or remove sounds of the multiple sound sources from the input audio signal; and provide the output audio signal to a second device.

Example 47 includes the non-transitory computer-readable medium of Example 46, wherein the input audio signal is processed using a neural network to generate the output audio signal.

According to Example 48, an apparatus includes: means for receiving an input audio signal at a first device; means for processing the input audio signal based on a combined representation of multiple sound sources to generate an output audio signal, wherein the combined representation is used to selectively retain or remove sounds of the multiple sound sources from the input audio signal; and means for providing the output audio signal to a second device.

Example 49 includes the apparatus of Example 48, wherein the means for receiving, the means for processing, and the means for providing are integrated into at least one of a smart speaker, a speaker bar, a computer, a tablet, a display device, a television, a gaming console, a music player, a radio, a digital video player, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a communication device, an internet-of-things (IoT) device, a virtual reality (VR) device, a base station, or a mobile device.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
one or more processors configured to:
receive an input audio signal including a plurality of sound sources;
process the input audio signal based on a combined representation of multiple sound sources to generate an output audio signal, wherein at least one of the plurality of sound sources of the input audio signal is included in the multiple sound sources, and wherein:
based on a retain flag having a first value, the combined representation is used to retain the at least one of the plurality of sound sources; and
based on the retain flag having a second value, the combined representation is used to remove the at least one of the plurality of sound sources; and
provide the output audio signal to a second device.

2. The device of claim 1, wherein the one or more processors are configured to, based on the retain flag having the first value, use the combined representation to retain the at least one of the plurality of sound sources and to remove one or more additional sound sources from the input audio signal.

3. The device of claim 2, wherein the one or more processors are configured to, responsive to a detected condition indicating that processing of the input audio signal is to be initiated, set the retain flag to have the first value indicating that the multiple sound sources are to be retained, wherein the first value of the retain flag is based on a user input, a default configuration, a configuration input from an application, a configuration request from another device, or a combination thereof.

4. The device of claim 1, wherein the multiple sound sources include one or more authorized users.

5. The device of claim 1, wherein the multiple sound sources include an emergency vehicle.

6. The device of claim 1, wherein the one or more processors are configured to, based on the retain flag having the second value, use the combined representation to remove the at least one of the plurality of sound sources and to retain one or more additional sound sources from the input audio signal.

7. The device of claim 6, wherein the one or more processors are configured to, responsive to a detected condition indicating that processing of the input audio signal is to be initiated, set the retain flag to have the second value indicating that the multiple sound sources are to be removed, wherein the second value of the retain flag is based on a user input, a default configuration, a configuration input from an application, a configuration request from another device, or a combination thereof.

8. The device of claim 1, wherein the multiple sound sources include traffic, wind, reverberation, channel distortion, another non-speech sound source, a person, or a combination thereof.

9. The device of claim 1, wherein the multiple sound sources are associated with background noise in a particular environment.

10. The device of claim 9, wherein the particular environment corresponds to an interior of a particular type of vehicle.

11. The device of claim 1, wherein the combined representation is based on particular sounds from particular sound sources, and wherein a particular sound source is a same sound source type as one of the multiple sound sources.

12. The device of claim 1, wherein the one or more processors are further configured to update the combined representation based on the sounds of any of the multiple sound sources.

13. The device of claim 1, wherein the one or more processors are further configured to, based on a combination setting, generate the combined representation based on individual representations of the multiple sound sources.

14. The device of claim 13, wherein the one or more processors are further configured to update the combination setting based on a user input, a detected condition, or both.

15. The device of claim 1, wherein the multiple sound sources include at least a first sound source and a second sound source, wherein a first representation of the first sound source indicates a first value of a particular feature, wherein a second representation of the second sound source indicates a second value of the particular feature, and wherein a value of the particular feature indicated by the combined representation is based on the first value and the second value.

16. The device of claim 15, wherein the first representation includes one or more spectrograms that are based on sounds from a particular sound source that is of the same type as the first sound source.

17. The device of claim 15, wherein the combined representation corresponds to a concatenation of a first representation of the first sound source with a second representation of the second sound source.

18. The device of claim 1, wherein the one or more processors are configured to process the input audio signal using a neural network to generate the output audio signal.

19. The device of claim 18, wherein the neural network includes a convolutional neural network (CNN), an autoregressive (AR) generative network, an audio generative network (AGN), an attention network (AN), a long short-term memory (LSTM) network, or a combination thereof.

20. The device of claim 18, further comprising a sound source encoder configured to process sounds from one or more sound sources to generate a representation of the one or more sound sources, wherein the sound source encoder and the neural network are jointly trained.

21. The device of claim 1, further comprising a receiver configured to receive audio data representing the input audio signal.

22. The device of claim 1, further comprising a transmitter configured to transmit audio data to the second device, the audio data based on the output audio signal.

23. A method comprising:
  receiving an input audio signal at a first device, the input audio signal including a plurality of sound sources;
  processing the input audio signal based on a combined representation of multiple sound sources to generate an output audio signal, wherein at least one of the plurality of sound sources of the input audio signal is included in the multiple sound sources, and wherein:
    based on a retain flag having a first value, the combined representation is used to retain the at least one of the plurality of sound sources; and
    based on the retain flag having a second value, the combined representation is used to remove the at least one of the plurality of sound sources; and
  providing the output audio signal to a second device.

24. The method of claim 23, wherein, based on the retain flag having the first value, the combined representation is used to retain the at least one of the plurality of sound sources and to remove one or more additional sound sources from the input audio signal.

25. The method of claim 23, wherein the multiple sound sources are associated with background noise in a particular environment.

26. The method of claim 25, wherein the particular environment corresponds to an interior of a particular type of vehicle.

27. A non-transitory computer-readable medium storing instructions that, when executed by one or more processors, cause the one or more processors to:
  receive an input audio signal at a first device, the input audio signal including a plurality of sound sources;
  process the input audio signal based on a combined representation of multiple sound sources to generate an output audio signal, wherein at least one of the plurality of sound sources of the input audio signal is included in the multiple sound sources, and wherein:
    based on a retain flag having a first value, the combined representation is used to retain the at least one of the plurality of sound sources; and
    based on the retain flag having a second value, the combined representation is used to remove the at least one of the plurality of sound sources; and
  provide the output audio signal to a second device.

28. The non-transitory computer-readable medium of claim 27, wherein the input audio signal is processed using a neural network to generate the output audio signal.

29. An apparatus comprising:
  means for receiving an input audio signal at a first device, the input audio signal including a plurality of sound sources;
  means for processing the input audio signal based on a combined representation of multiple sound sources to generate an output audio signal, wherein at least one of the plurality of sound sources of the input audio signal is included in the multiple sound sources, and wherein:
    based on a retain flag having a first value, the combined representation is used to retain the at least one of the plurality of sound sources; and
    based on the retain flag having a second value, the combined representation is used to remove the at least one of the plurality of sound sources; and
  means for providing the output audio signal to a second device.

30. The apparatus of claim 29, wherein the means for receiving, the means for processing, and the means for providing are integrated into at least one of a smart speaker, a speaker bar, a computer, a tablet, a display device, a television, a gaming console, a music player, a radio, a digital video player, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a communication device, an internet-of-things (IoT) device, a virtual reality (VR) device, a base station, or a mobile device.

* * * * *